US008079962B2

(12) United States Patent
Takai et al.

(10) Patent No.: US 8,079,962 B2
(45) Date of Patent: Dec. 20, 2011

(54) METHOD AND APPARATUS FOR REPRODUCING CONTENT DATA

(75) Inventors: Motoyuki Takai, Tokyo (JP); Kosei Yamashita, Kanagawa (JP); Yasushi Miyajima, Kanagawa (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 11/336,332

(22) Filed: Jan. 20, 2006

(65) Prior Publication Data

US 2006/0189902 A1 Aug. 24, 2006

(30) Foreign Application Priority Data

Jan. 20, 2005 (JP) .................................. 2005-012534

(51) Int. Cl.
*A61B 5/103* (2006.01)

(52) U.S. Cl. .......................... 600/587; 36/139; 600/595

(58) Field of Classification Search .................. 600/587; 84/633
See application file for complete search history.

(56) References Cited

U.S. PATENT DOCUMENTS

| | | | | |
|---|---|---|---|---|
| 4,776,323 A | * | 10/1988 | Spector | 601/23 |
| 5,002,491 A | | 3/1991 | Abrahamson et al. | |
| 5,119,474 A | | 6/1992 | Beitel et al. | |
| 5,137,501 A | * | 8/1992 | Mertesdorf | 482/57 |
| 5,648,627 A | * | 7/1997 | Usa | 84/600 |
| 6,157,744 A | | 12/2000 | Nagasaka et al. | |
| 6,230,192 B1 | | 5/2001 | Roberts et al. | |
| 6,336,891 B1 | * | 1/2002 | Fedrigon et al. | 482/8 |
| 6,349,275 B1 | | 2/2002 | Schumacher et al. | |
| 6,389,222 B1 | | 5/2002 | Ando et al. | |
| 6,390,923 B1 | | 5/2002 | Yoshitomi et al. | |
| 6,408,128 B1 | | 6/2002 | Abecassis | |
| 6,570,078 B2 | | 5/2003 | Ludwig | |
| 6,578,047 B1 | | 6/2003 | Deguchi | |
| 6,662,231 B1 | | 12/2003 | Drosset et al. | |
| 6,697,824 B1 | | 2/2004 | Bowman-Amuah | |
| 6,704,729 B1 | | 3/2004 | Klein et al. | |

(Continued)

FOREIGN PATENT DOCUMENTS

EP 1 039 400 A2 9/2000

(Continued)

OTHER PUBLICATIONS

Chang et al., Overview of the MPEG-7 Standard, IEEE Transactions on Circuits and Systems for Video Technology, vol. 11 No. 6, Jun. 2001, pp. 688-695.

(Continued)

*Primary Examiner* — Max Hindenburg
*Assistant Examiner* — Renee Danega
(74) *Attorney, Agent, or Firm* — Wolf, Greenfield & Sacks, P.C.

(57) ABSTRACT

An apparatus for reproducing a content, includes a reproduction processing unit for reproducing the content, a detecting unit for detecting a motion of a person, a predicting unit for predicting a timing of the motion of the person, based on an output from the detecting unit, and a control unit for controlling the reproduction processing unit in the reproduction of the content by synthesizing a timing indicated by timing information corresponding to the content to be reproduced with the timing of the motion of the person, predicted by the predicting unit.

21 Claims, 14 Drawing Sheets

U.S. PATENT DOCUMENTS

| | | | |
|---|---|---|---|
| 6,757,482 B1 | 6/2004 | Ochiai et al. | |
| 6,807,558 B1 | 10/2004 | Hassett et al. | |
| 6,813,438 B1 | 11/2004 | Bates et al. | |
| 6,839,680 B1 | 1/2005 | Liu et al. | |
| 6,868,440 B1 | 3/2005 | Gupta et al. | |
| 6,944,542 B1 | 9/2005 | Eschenbach | |
| 6,944,621 B1 | 9/2005 | Collart | |
| 7,161,887 B2 | 1/2007 | Snow et al. | |
| 7,260,402 B1 | 8/2007 | Ahmed | |
| 7,293,066 B1 | 11/2007 | Day | |
| 7,320,137 B1 | 1/2008 | Novak et al. | |
| 7,346,920 B2 | 3/2008 | Lamkin et al. | |
| 7,395,549 B1 | 7/2008 | Perlman et al. | |
| 7,451,177 B1 | 11/2008 | Johnson et al. | |
| 7,464,137 B2 | 12/2008 | Zhu et al. | |
| 7,521,623 B2 * | 4/2009 | Bowen | 84/612 |
| 7,521,624 B2 | 4/2009 | Asukai et al. | |
| 7,542,816 B2 | 6/2009 | Rosenberg | |
| 7,546,626 B2 | 6/2009 | Ohnuma | |
| 7,790,976 B2 | 9/2010 | Takai et al. | |
| 7,930,385 B2 | 4/2011 | Takai et al. | |
| 2001/0010754 A1 | 8/2001 | Ando et al. | |
| 2001/0014620 A1 | 8/2001 | Nobe et al. | |
| 2001/0015123 A1 * | 8/2001 | Nishitani et al. | 84/615 |
| 2001/0043198 A1 | 11/2001 | Ludtke | |
| 2001/0055038 A1 | 12/2001 | Kim | |
| 2002/0056142 A1 | 5/2002 | Redmond | |
| 2002/0073417 A1 | 6/2002 | Kondo et al. | |
| 2002/0085833 A1 | 7/2002 | Miyauchi | |
| 2002/0104101 A1 | 8/2002 | Yamato et al. | |
| 2002/0152122 A1 | 10/2002 | Chino et al. | |
| 2003/0007777 A1 | 1/2003 | Okajima et al. | |
| 2003/0018622 A1 | 1/2003 | Chau | |
| 2003/0026433 A1 | 2/2003 | Matt | |
| 2003/0034996 A1 | 2/2003 | Li et al. | |
| 2003/0060728 A1 | 3/2003 | Mandigo | |
| 2003/0065665 A1 | 4/2003 | Kinjo | |
| 2003/0069893 A1 | 4/2003 | Kanai et al. | |
| 2003/0088647 A1 | 5/2003 | ShamRao | |
| 2003/0093790 A1 | 5/2003 | Logan et al. | |
| 2003/0113096 A1 | 6/2003 | Taira et al. | |
| 2003/0126604 A1 | 7/2003 | Suh | |
| 2003/0163693 A1 | 8/2003 | Medvinsky | |
| 2003/0212810 A1 | 11/2003 | Tsusaka et al. | |
| 2004/0000225 A1 * | 1/2004 | Nishitani et al. | 84/610 |
| 2004/0044724 A1 | 3/2004 | Bell et al. | |
| 2004/0049405 A1 | 3/2004 | Buerger et al. | |
| 2004/0064209 A1 | 4/2004 | Zhang | |
| 2004/0126038 A1 | 7/2004 | Aublant et al. | |
| 2004/0220830 A1 | 11/2004 | Moreton et al. | |
| 2004/0252397 A1 | 12/2004 | Hodge et al. | |
| 2004/0255335 A1 | 12/2004 | Fickle et al. | |
| 2004/0259529 A1 | 12/2004 | Suzuki | |
| 2005/0041951 A1 | 2/2005 | Inoue et al. | |
| 2005/0102365 A1 | 5/2005 | Moore et al. | |
| 2005/0126370 A1 | 6/2005 | Takai et al. | |
| 2005/0241465 A1 | 11/2005 | Goto | |
| 2005/0249080 A1 | 11/2005 | Foote et al. | |
| 2005/0278758 A1 | 12/2005 | Bodlaender | |
| 2005/0288991 A1 | 12/2005 | Hubbard et al. | |
| 2006/0078297 A1 | 4/2006 | Nishikawa et al. | |
| 2006/0087925 A1 | 4/2006 | Takai et al. | |
| 2006/0107822 A1 | 5/2006 | Bowen | |
| 2006/0112411 A1 | 5/2006 | Takai et al. | |
| 2006/0174291 A1 | 8/2006 | Takai et al. | |
| 2006/0190413 A1 | 8/2006 | Harper | |
| 2006/0220882 A1 | 10/2006 | Makino | |
| 2006/0243120 A1 | 11/2006 | Takai et al. | |
| 2006/0245599 A1 | 11/2006 | Regnier | |
| 2006/0250994 A1 | 11/2006 | Sasaki et al. | |
| 2007/0005655 A1 | 1/2007 | Takehara et al. | |
| 2007/0025194 A1 | 2/2007 | Morse et al. | |
| 2007/0044010 A1 | 2/2007 | Sull et al. | |
| 2007/0067311 A1 | 3/2007 | Takai et al. | |
| 2007/0074253 A1 | 3/2007 | Takai et al. | |
| 2007/0074619 A1 | 4/2007 | Vergo | |
| 2007/0085759 A1 | 4/2007 | Lee et al. | |
| 2007/0098354 A1 | 5/2007 | Ando et al. | |
| 2007/0186752 A1 | 8/2007 | Georges et al. | |
| 2007/0204744 A1 | 9/2007 | Sako et al. | |
| 2007/0221045 A1 | 9/2007 | Terauchi et al. | |
| 2007/0265720 A1 | 11/2007 | Sako et al. | |
| 2008/0153671 A1 * | 6/2008 | Ogg et al. | 482/3 |
| 2008/0263020 A1 | 10/2008 | Takehara et al. | |
| 2009/0028009 A1 | 1/2009 | Johnson et al. | |

FOREIGN PATENT DOCUMENTS

| | | |
|---|---|---|
| EP | 1 128 358 A1 | 8/2001 |
| EP | 1 160 651 A1 | 12/2001 |
| EP | 1 320 101 A | 6/2003 |
| EP | 1 503 376 A2 | 2/2005 |
| EP | 1 705 588 A1 | 9/2006 |
| EP | 1 729 290 A1 | 12/2006 |
| EP | 1 746 520 A2 | 1/2007 |
| JP | 04-044096 A | 2/1992 |
| JP | 05-273971 | 10/1993 |
| JP | 06-290574 A | 10/1994 |
| JP | 07-064547 A | 3/1995 |
| JP | 07-110681 A | 4/1995 |
| JP | 08-152880 | 6/1996 |
| JP | 08-286663 | 11/1996 |
| JP | 08-322014 A | 12/1996 |
| JP | 08-328555 | 12/1996 |
| JP | 09-107517 A | 4/1997 |
| JP | 10-055174 A | 2/1998 |
| JP | 10-124047 | 5/1998 |
| JP | 10-254445 | 9/1998 |
| JP | 11-126067 | 5/1999 |
| JP | 2000-003174 A | 1/2000 |
| JP | 2000-020054 A | 1/2000 |
| JP | 2000-207263 A | 7/2000 |
| JP | 2000-214851 | 8/2000 |
| JP | 3088409 B2 | 9/2000 |
| JP | 2000-285059 A | 10/2000 |
| JP | 2001-022350 A | 1/2001 |
| JP | 2001-075995 A | 3/2001 |
| JP | 3147888 B2 | 3/2001 |
| JP | 2001-166772 A | 6/2001 |
| JP | 2001-282813 A | 10/2001 |
| JP | 2001-297090 A | 10/2001 |
| JP | 2001-299980 A | 10/2001 |
| JP | 2001-321564 A | 11/2001 |
| JP | 2001-324984 A | 11/2001 |
| JP | 2001-325787 A | 11/2001 |
| JP | 2001-357008 A | 12/2001 |
| JP | 2001-359096 A | 12/2001 |
| JP | 2002-023746 A | 1/2002 |
| JP | 2002-049631 A | 2/2002 |
| JP | 2002-092013 A | 3/2002 |
| JP | 2002-108918 A | 4/2002 |
| JP | 2002-189663 A | 7/2002 |
| JP | 2002-238022 A | 8/2002 |
| JP | 2002-251185 A | 9/2002 |
| JP | 2002-282227 A | 10/2002 |
| JP | 2002-330411 A | 11/2002 |
| JP | 2003-023589 A | 1/2003 |
| JP | 2003-037856 A | 2/2003 |
| JP | 2003-050816 A | 2/2003 |
| JP | 2003-058770 A | 2/2003 |
| JP | 2003-150173 A | 5/2003 |
| JP | 2003-157375 A | 5/2003 |
| JP | 2003-162285 A | 6/2003 |
| JP | 2003-177749 A | 6/2003 |
| JP | 2003-224677 A | 8/2003 |
| JP | 2004-073272 A | 3/2004 |
| JP | 2004-078467 A | 3/2004 |
| JP | 2004-139576 A | 5/2004 |
| JP | 2004-151855 A | 5/2004 |
| JP | 2004-173102 A | 6/2004 |
| JP | 2004-185535 A | 7/2004 |
| JP | 2004-199667 A | 7/2004 |
| JP | 2004-222239 A | 8/2004 |
| JP | 2004-226625 | 8/2004 |
| JP | 2004-234807 A | 8/2004 |
| JP | 2004-526372 A | 8/2004 |
| JP | 2004-252654 A | 9/2004 |
| JP | 2004-259313 A | 9/2004 |

| | | | |
|---|---|---|---|
| JP | 2004-259430 A | 9/2004 |
| JP | 2004-282775 A | 10/2004 |
| JP | 2004-317819 A | 11/2004 |
| JP | 2004-326840 A | 11/2004 |
| JP | 2004-361713 A | 12/2004 |
| JP | 2004-362145 A | 12/2004 |
| JP | 2004-362489 A | 12/2004 |
| JP | 2004-362601 A | 12/2004 |
| JP | 3598613 B2 | 12/2004 |
| JP | 2005-004604 A | 1/2005 |
| JP | 2005-043916 A | 2/2005 |
| JP | 2005-062971 A | 3/2005 |
| JP | 2005-084336 A | 3/2005 |
| JP | 2005-093068 A | 4/2005 |
| JP | 2005-107867 A | 4/2005 |
| JP | 2005-156641 A | 6/2005 |
| JP | 2005-196918 A | 7/2005 |
| JP | 2005-202319 A | 7/2005 |
| NL | 1023191 C2 | 10/2004 |
| WO | WO 93/22762 A1 | 11/1993 |
| WO | WO 01/82302 A1 | 11/2001 |
| WO | WO 02/05124 A1 | 1/2002 |
| WO | WO 02/080524 A2 | 10/2002 |
| WO | WO 02/093344 A1 | 11/2002 |
| WO | WO 03/043007 A2 | 5/2003 |
| WO | WO 2004/023358 A1 | 3/2004 |
| WO | WO 2004/077706 A1 | 9/2004 |

OTHER PUBLICATIONS

Hawley, "Structure out of Sound", MIT PhD Thesis, pp. 15-54, 78-108, and 130-154.

McParland et al., "Exchanging TV-Anytime Metadata over IP Networks", Document AN462 Submitted to the TC-Anytime Forum, Sep. 17, 2002, pp. 1-38.

Hawley, Structure out of sound. MIT PhD Thesis. 1993, pp. 1-185.

Koike et al., Timeslider: an interface to specify time point. Proc. of the ACM $10^{th}$ Annual Symposium on User Interface Software and Technology. Oct. 17, 1997, pp. 43-44, Alberta, Canada.

Little et al., A digital on-demand video service supporting content-based queries. http://portal.acm.org/ft_gateway.cfm?id=168450&type=pdf&coll=GUIDE&d1=GUIDE&CFID=16 387603&CFTOKEN=17953305. Proc. of the First ACM International Conference on Multimedia. New York, Aug. 1, 1993, 9 pages, XP-002429294.

O'Keeffe, Karl, Dancing monkeys. Masters project. Jun. 18, 2003, pp. 1-66.

Zhang et al., Database and metadata support of a web-based multimedia digital library for medical education. http://www.springerlink.com/content/69Ohg1rxv19gwy2q/fulltext.pdf. Proc. of the First International Conference on Advances in Web-based Learning, ICWL 2002. China, Aug. 17, 2002, pp. 339-350, XP002429295.

* cited by examiner

MOTION DETECTION DIRECTION

METHOD AND APPARATUS FOR REPRODUCING CONTENT DATA

CROSS REFERENCES TO RELATED APPLICATIONS

The present invention contains subject matter related to Japanese Patent Application JP 2005-012534 filed in the Japanese Patent Office on Jan. 20, 2005, the entire contents of which are incorporated herein by reference.

BACKGROUND OF THE INVENTION

1. Field of the Invention

The present invention relates to a method and apparatus for reproducing a content such as music and video.

2. Description of the Related Art

Computers serving as a controller for a variety of apparatuses are becoming more and more compact and sophisticated in performance. With such a computer incorporated in a reproducing apparatus reproducing music and video, the reproducing apparatus also becomes sophisticated in performance. Such a high-performance reproducing apparatus offers to users a wider range of entertainment of contents to be reproduced, such as audio and video.

For example, a contemplated audio/visual (AV) apparatus automatically starts reproducing a content by detecting a motion of a user in a room without the need for the user to select one of a reproduction button and an end button. Also contemplated are an AV apparatus and a disk jockey/video jockey (DJ/VD) tool for imparting a change to a content currently being reproduced in synchronization with the motion of the user.

Japanese Unexamined Patent Application Publication No. 2004-246535 discloses a technique, in which the feeling and psychology of a user are detected, and a content matching the user is presented based on information of the feeling and psychology or information obtained from analyzing the feeling and psychology.

It is thus contemplated that a content to be reproduced is changed and/or selected by detecting the motion of the user or based on bio-information of the user. The range of usage and entertainment of the content to be reproduced, such as audio and video, is thus widened.

SUMMARY OF THE INVENTION

There is a need for further widening the range of usage and entertainment of audio and video through a mobile audio device and a fitness machine, each capable of changing a reproduction speed of music in synchronization with a gait tempo of a user. To satisfy such a need, a technique of sensing the state of the user and reflecting the sensed state in the content is important.

In one contemplated sensing method, a feature point of a physical motion of a user (timing of the user's entering a room, a timing of a motion of the body of the user, a timing of the user's treading motion, etc.) is detected from an acceleration sensor, a camera, and a pressure sensor embedded into the floor of a room, and a start point and a beat of a content are thus synchronized with the physical motion of the user. In this method, a trigger timing felt by the user (the moment the user extends his arm, or steps on his foot) sometimes fails to be synchronized with the feature point of a sensor signal (such as a maximum point), and the reproduction timing of the content needs to be placed ahead of or behind the feature point of the sensor signal. Fine adjustment is required.

Signals from sensors may be successively processed, and a reproduction method of a content may be determined after the detection of a trigger. In such a case, a time lag occurs, thereby causing the motion and action of the user and the content being reproduced to be out of synchronization. The synchronization with and real time response to the physical motion are important in the entertainment of the content. To reproduce the content, such as audio and video, in synchronization with the action of the user, in an effective manner, the synchronization and response of the reproduction of the content with the motion of the user need to be maintained excellently.

It is thus desirable to provide a method and apparatus for synthesizing the reproduction timing of the content with the motion and action of the user to achieve good synchronization and response, and to use the content effectively.

An apparatus for reproducing a content, includes a reproduction processing unit for reproducing the content, a detecting unit for detecting a motion of a person, a predicting unit for predicting a timing of the motion of the person, based on an output from the detecting unit, and a control unit for controlling the reproduction processing unit in the reproduction of the content by synthesizing a timing indicated by timing information corresponding to the content to be reproduced with the timing of the motion of the person, predicted by the predicting unit.

In the content reproducing apparatus, the reproduction processing unit reproduces the content, the detecting unit detects the motion of the person, and the predicting unit predicts the timing of the motion of the person, based on the output from the detecting unit.

The control unit controls the reproduction processing unit in the reproduction of the content by synthesizing the timing indicated by timing information corresponding to the content to be reproduced with the timing of the motion of the person, predicted by the predicting unit.

The reproduction timing of the content is thus synthesized with the motion and action of the user. The content is reproduced so that the synchronization and response of the content to the motion and action of the user are improved. The content to be reproduced offers more entertainment. As a result, the content is more effectively enjoyed.

In accordance with embodiments of the present invention, the rhythm and change timing of the motion of the user reproducing and using the content are predicted so that the reproduction timing of the content is synchronized with the rhythm and change timing of the motion of the user. With this arrangement, the feeling and entertainment of the user who moves in synchronization with the content, such as music, are enhanced. The content is effectively used.

DESCRIPTION OF THE PREFERRED EMBODIMENTS

The embodiments of the present invention are described below with reference to the drawings.

Figure 1:
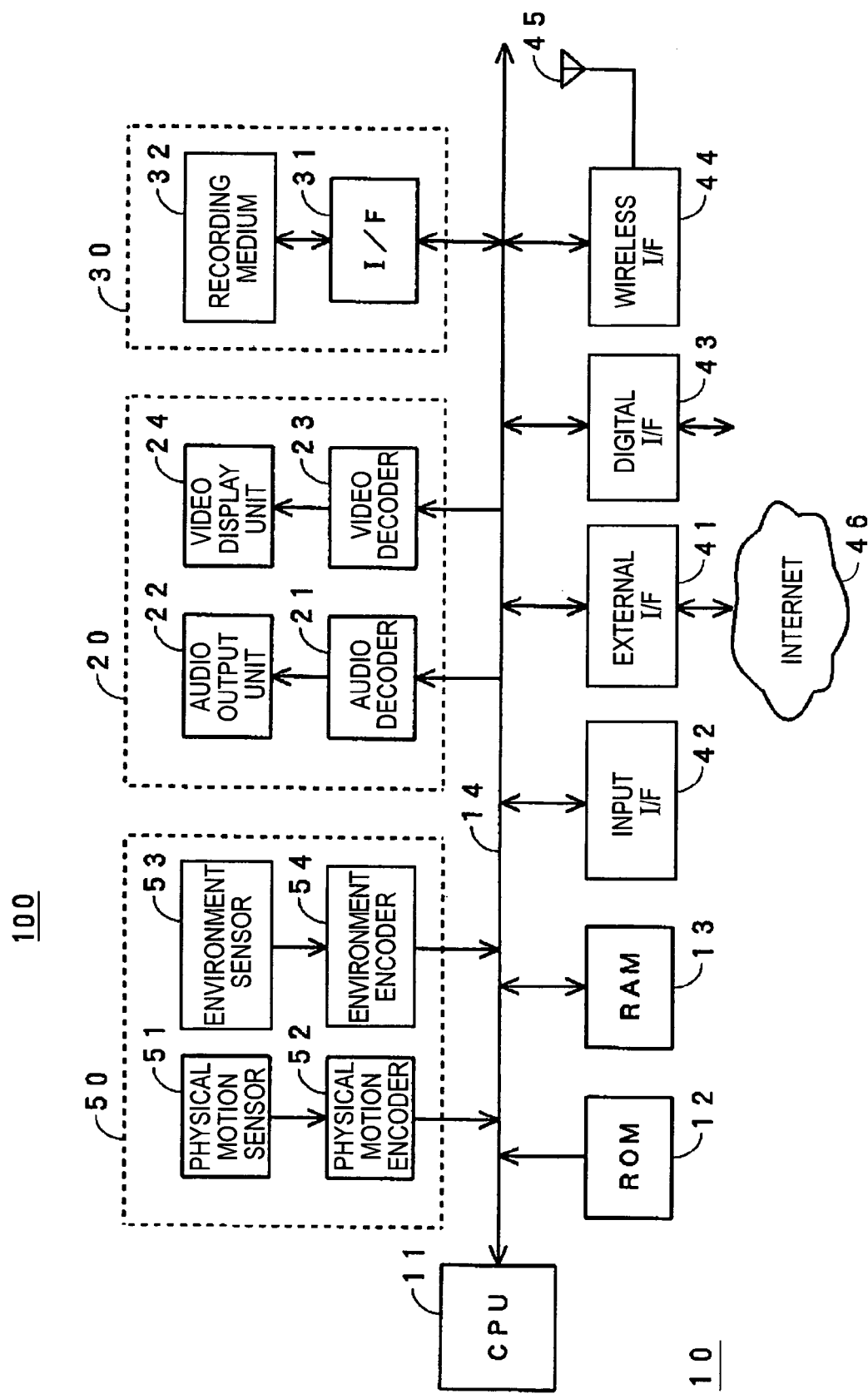
FIG. 1 is a block diagram illustrating a content reproducing apparatus in accordance with one embodiment of the present invention.

FIG. 1 is a block diagram of a content reproducing apparatus in accordance with one embodiment of the present invention. As shown in FIG. 1, the content reproducing apparatus includes a controller 10, an output module 20, a storage 30, an external interface (I/F) 41, an input I/F 42, a digital I/F 43, a wireless I/F 44, a transceiver antenna 45, and a sensor module 50.

The controller 10 is a microcomputer including a central processing unit (CPU) 11, a read-only memory (ROM) 12, and a random-access memory (RAM) 13, with all these elements connected via a CPU bus 14, and controls each block of the content reproducing apparatus (recording and reproducing apparatus).

The output module 20 includes an audio decoder 21, an audio output unit 22, a video decoder 23, and a video display unit 24. The audio output unit 22 is a loudspeaker, for example, and the video display unit 24 is a display device such as a liquid-crystal display (LCD), a plasma display panel (PDP), an electroluminescence (EL) display, or a cathode-ray tube (CRT). The audio decoder 21 decodes audio data being reproduced into an analog audio signal to be supplied to the audio output unit 22. The video decoder 23 decodes video data being reproduced into an analog video signal to be supplied to the video display unit 24.

The storage 30 includes an interface (I/F) 31 and a recording medium 32. The recording medium 32 may be one of a hard disk, an optical disk, an electromagnetic disk, a semi-conductor memory, a flexible disk, etc.

Alternatively, the recording medium 32 may include a plurality of identical recording media, such as a plurality of hard disks, or a plurality of optical disks. Furthermore, the recording medium 32 may include a plurality of different recording media, such as a combination of a hard disk and an optical disk, or a combination of an optical disk and a magneto-optical disk. The recording medium 32 may be one of a built-in type or a removable type.

As will be described later, the recording medium 32 stores audio data, video data, audio-visual (AV) data, software programs, and other content data. The AV data contains video data and audio data, both of which can be reproduced in synchronization. The AV data is content data, such as video.

The recording medium 32 also stores, as content attribute information of each content data, delimitation information indicating various delimitation positions of the content data. The delimitation information is arranged in each content data, and is stored on the recording medium 32 in association with the corresponding content data. As will be described later, the delimitation information can be downloaded from a server over the Internet via the external I/F 41, or from an external apparatus via one of the digital I/F 43 and the wireless I/F 44. The delimitation information can be acquired together with or separate from the content data.

The external I/F 41 in the recording and reproducing apparatus of this embodiment is used to connect to the Internet 100. The recording and reproducing apparatus can thus download a variety of content data including audio data, video data, AV data, and text data via the Internet 100, and store the downloaded data onto the recording medium 32 via the I/F 31. Conversely, the recording and reproducing apparatus of this embodiment can transmit information to a target server to store the information therein.

The input I/F 42 is a keyboard receiving an operational input from a user. An operational input received via the input I/F 42 is converted into an electrical signal, which is then supplied to the controller 10. In response to the operational input from the user, the controller 10 controls the recording and reproducing apparatus of the present embodiment.

The digital I/F 43 complies with the Institute of Electrical and Electronics Engineers (IEEE) 1394, Universal Serial Bus (USB) standards, or other digital interface standards. The digital I/F 43, connected to another electrical apparatus via a dedicated line, exchanges, with the electrical apparatus, data such as the content data and the delimitation information.

The wireless I/F 44 and the transceiver antenna 45 are linked with a wireless local area network (LAN) for information exchange. The recording and reproducing apparatus can receive the content data and the delimitation information from the wireless LAN via the wireless I/F 44 and the transceiver antenna 45.

In the recording and reproducing apparatus of this embodiment, the recording medium 32 in the storage 30 stores the content data while storing the delimitation information corresponding to the content data at the same time. The delimitation information, as the content attribute data, can be acquired, separately from the corresponding content data, via one of the external I/F 41, the digital I/F 43, and the wireless I/F 44.

Each content data and the delimitation information corresponding thereto are associated by predetermined identification information. The delimitation information of the corresponding content data can be supplied on each of a variety of recording media. The delimitation information can be supplied as being recorded on the same file, but on a chunk different from a chunk storing the content data. In such a case, the delimitation information can be also correctly acquired and used.

The recording and reproducing apparatus of the present embodiment can transmit the content data and the delimitation information to another apparatus via one of the external I/F 41, the digital I/F 43, and the wireless I/F 44.

The sensor module 50 includes a physical motion sensor 51, a physical motion encoder 52, an environment sensor 53, and an environment encoder 54. The physical motion sensor 51 is mounted on the body of a user, or located in the vicinity of the user to detect the motion of the user and convert the detected motion into an electrical signal. For example, the physical motion sensor 51 is one of a distortion sensor, an acceleration sensor, a shock sensor, a vibration sensor, a bearing sensor, a bend sensor, a pressure sensor, an image sensor, a pyroelectric sensor, an infrared sensor, an electrical charge sensor, and the like.

The physical motion sensor 51 may be a video camera for picking up the image of the user. By analyzing video data captured by the video camera, the motion of the user is detected. A GPS (global positioning system) sensor may also be used as the physical motion sensor 51. Since the GPS sensor can precisely fix the position of the user, the movement of the user can be monitored.

For example, the motion of the user using the recording and reproducing apparatus includes a walking movement of the user, an up and down motion of the body of the user, a swing motion of the head of the user in forward and backward directions and lateral direction, an arm waving movement, a forward and backward and lateral movement of the torso, a movement of the body of the user entering into a room and leaving the room, and a change in the posture of the body of the user. More in detail, the motion of the user includes a variety of each portion of the body of the user, including the movement of the hand, the movement of the foot, hand clapping, and walking gait. A change in the posture of the body includes standing up, sitting down, and lying flat.

Information concerning the position of the user, fixed by GPS, for example, information that the user has arrived at a destination, also indicates the motion of the user. A user operational input entered to a button, a keyboard, or a percussion instrument type dedicated interface may also be used as information indicating the motion of the user.

The physical motion encoder 52, serving as an interface between the physical motion sensor 51 and the controller 10 in the content reproducing apparatus 100, converts detection data from the physical motion sensor 51 into data in a format compatible with the controller 10.

The environment sensor 53 acquires, in the form of an electrical signal, information relating to the environment in which the user is. For example, the environment sensor 53 includes one of a temperature sensor, a humidity sensor, a wind meter, and an illuminance sensor. The environment encoder 54 converts data from the environment sensor 53 into data in a format compatible with the controller 10. The encoder 54 thus serves as an interface between the environment sensor 53 and the controller 10.

Detection data (sensor signals) from the physical motion sensor 51 and the environment sensor 53 is transferred to the controller 10 in the recording and reproducing apparatus via the physical motion encoder 52 and the environment encoder 54, respectively. As will be discussed in detail later, the controller 10 controls reproduction operation of the content to be reproduced, in response to the sensor signals from the sensor module 50.

Figure 2:
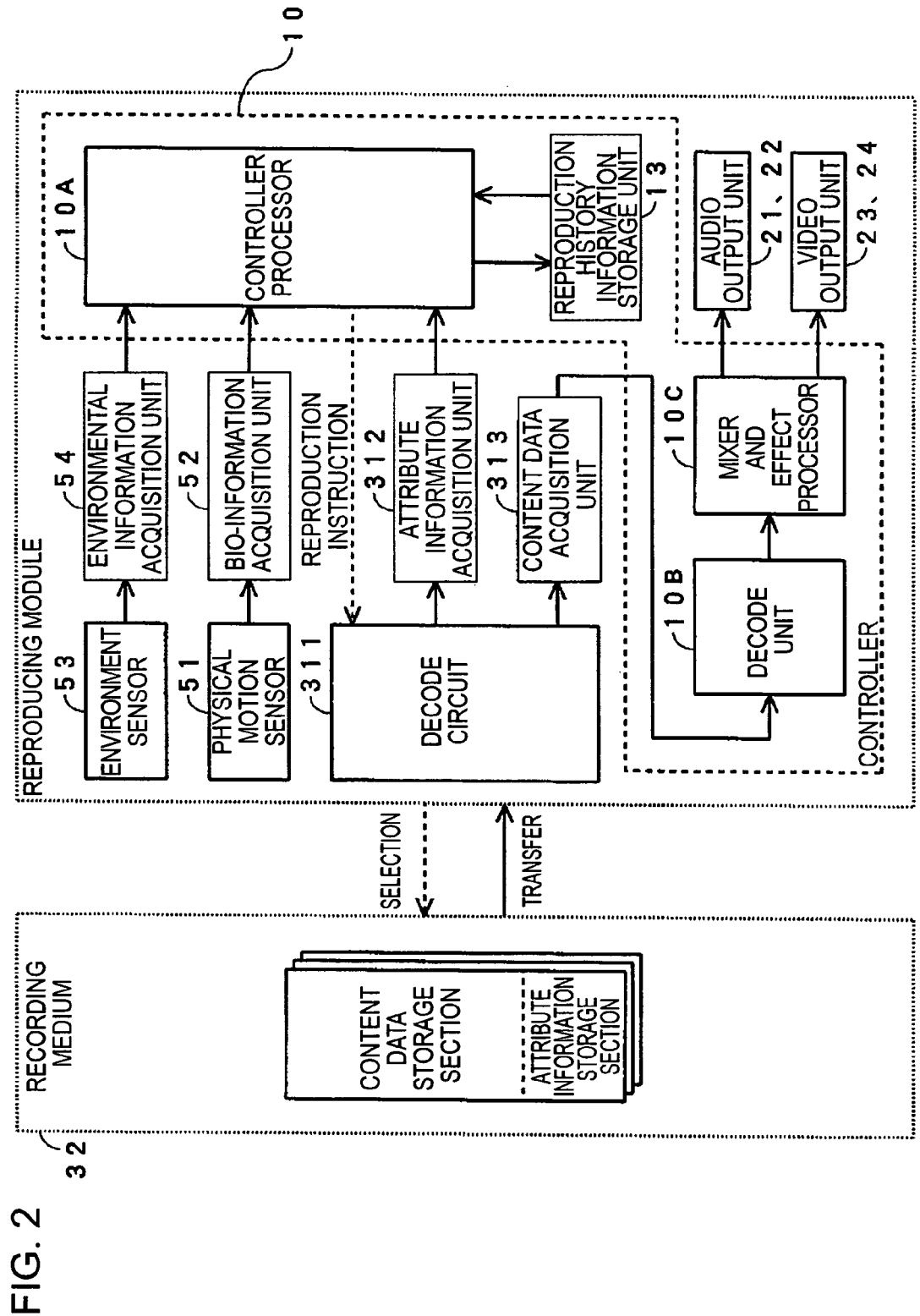
FIG. 2 is a block diagram illustrating in more detail the content reproducing apparatus of FIG. 1.

FIG. 2 is a block diagram illustrating in detail the content reproducing apparatus of this embodiment. The content reproducing apparatus includes a recording medium 32, and a reproducing module of the apparatus of FIG. 1 without interfaces designated with reference numerals 41-44.

The recording medium 32 includes a content data storage section and an attribute information storage section, and stores content data and attribute data in association with the content data. The controller 10 includes a controller processor 10A, a decode unit 10B, and a mixer and effect processor 10C. The RAM 13 serves as a reproduction history information storage unit.

The sensor signals from the physical motion sensor 51 are supplied to the controller processor 10A in the controller 10 via the encoder 52 serving as a bio-information acquisition unit, and the sensor signal from the environment sensor 53 is supplied to the controller processor 10A in the controller 10 via the environment encoder 54 serving as an environment information acquisition unit.

The I/F 31 reads the content data received via the input I/F 42 in response to a reproduction instruction from the controller processor 10A in the controller 10. The I/F 31 functions as a decode circuit 311, an attribute information acquisition unit 312, and a content data acquisition unit 313. The delimitation information as the content attribute information is supplied to the controller processor 10A in the controller 10 while the content data is supplied to the decode unit 10B in the controller 10.

The controller processor 10A in the controller 10 predicts the timing of a motion (motion timing) of the user based on the sensor signals successively input from the physical motion sensor 51, and synchronize a target delimitation position (delimitation timing) of the content to be reproduced with the predicted motion timing of the user. Synchronization feeling and response of the reproduced content are thus improved.

The controller processor 10A in the content reproducing apparatus of the present embodiment predicts the motion timing of the user by analyzing the sensor signals successively supplied from the physical motion sensor 51, and controls the reproduction process of the content so that the target delimitation position of the content is synchronized with the motion timing. The motion timing of the user thus matches the reproduction timing of the content to be reproduced.

In the content reproducing apparatus of the present embodiment, the sensor signal from the environment sensor 53 is also supplied to the controller processor 10A. The sensor signal from the environment sensor 53 is also taken into account in the control of the reproduction process of the content to be reproduced. If the environment sensor 53 is a temperature sensor, the reproduction speed of the content is adjusted in response to the detected temperature.

The controller processor 10A in the controller 10 controls the decode unit 10B and the mixer and effect processor 10C, thereby performing the reproduction process of the content data. More specifically, after being decompressed by the decode unit 10B, the content data is supplied to the mixer and effect processor 10C. In response to a control signal from the controller processor 10A, the mixer and effect processor 10C synchronizes each delimitation timing of the content indicated by the delimitation information with the motion timing of the user, thereby causing the reproduction timing to be synchronized with the movement of the user.

An audio signal from the mixer and effect processor 10C is supplied to an audio decoder 21 and an audio output unit 22, both forming an audio output device, to output a reproduced sound. A video signal from the mixer and effect processor 10C is supplied to a video decoder 23, and a video display unit 24, both forming a video output device, to display a reproduced video.

The content reproducing apparatus constructed as discussed with reference to FIGS. 1 and 2 predicts the motion timing of the user based on the detected output from the physical motion sensor 51, and synchronizes the reproduction timing of the content with the predicted timing. In this way, the synchronization and response, felt by the user in response to the reproduced content, are improved.

The content in the context of the present invention includes music, audio other than music, a moving image, a still image (graphics, drawings, characters), vibrations, light such as illumination light, and exercise performed using a variety of fitness machines. The content thus includes everything humans can view or sense. As shown in FIG. 1, the content is music or video, for example.

Figure 3:
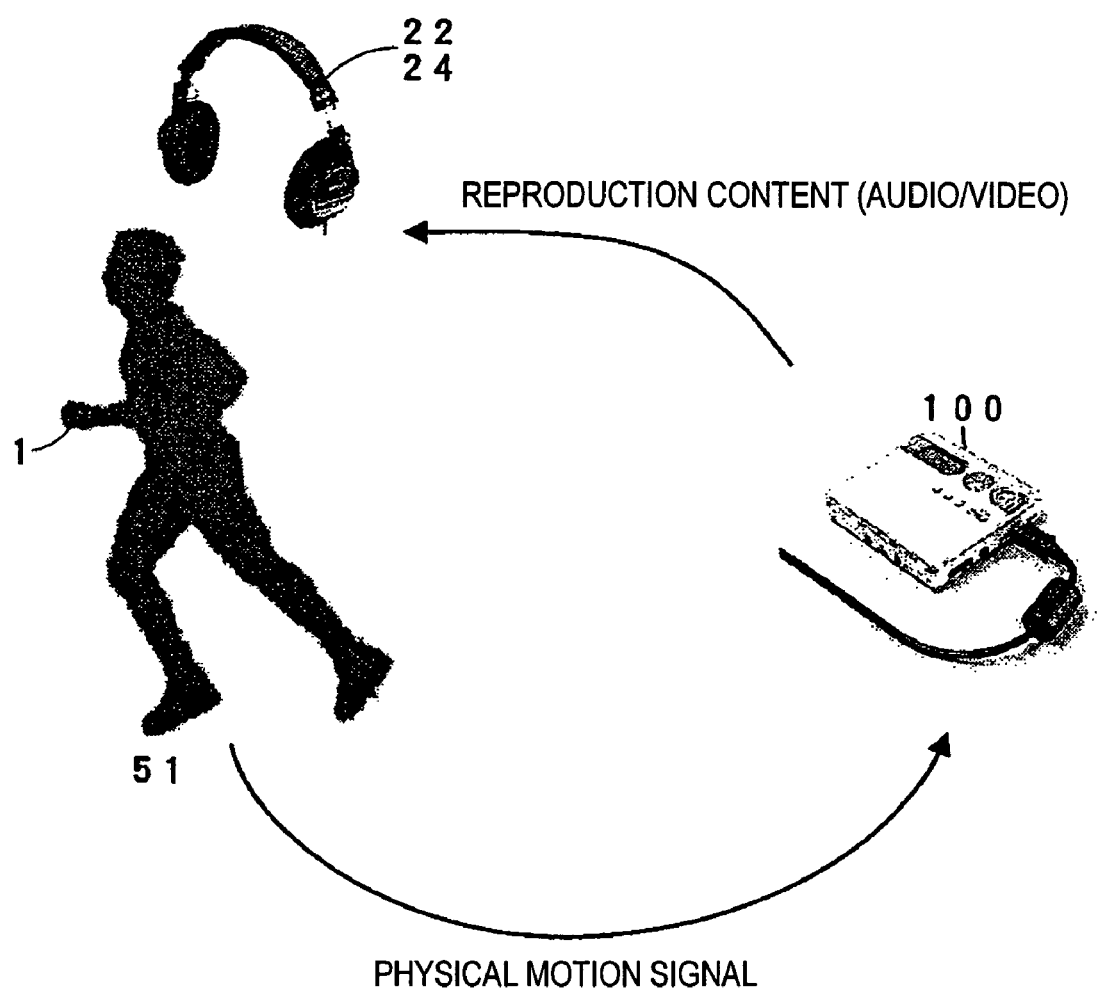
FIG. 3 illustrates a mobile version of the content reproducing apparatus of FIG. 1.
Figure 4:
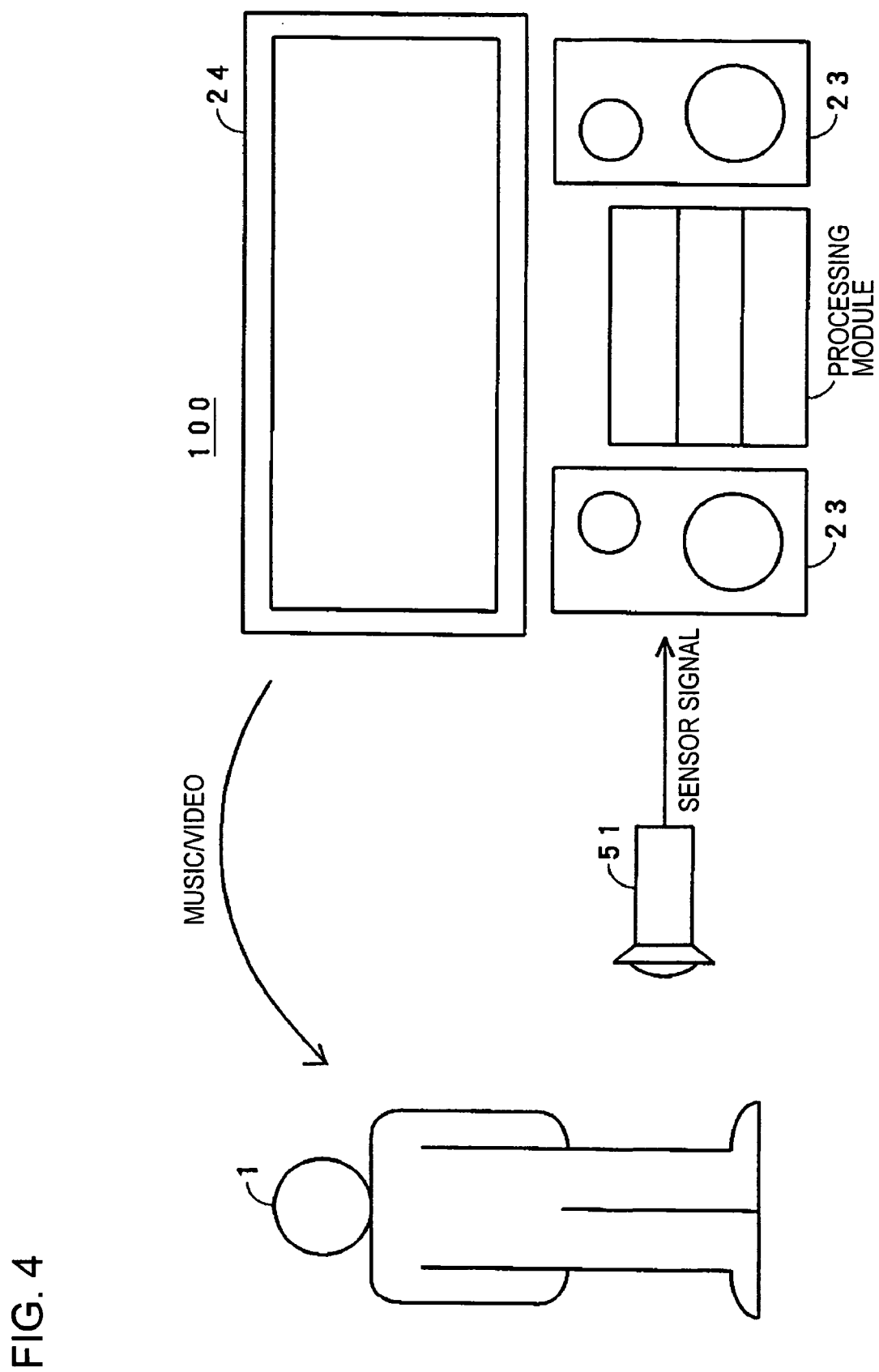
FIG. 4 illustrates an stationary version of the content reproducing apparatus of FIG. 1.

The content reproducing apparatus constructed as described with reference to FIGS. 1 and 2 may be implemented as a mobile type or a stationary type. FIG. 3 illustrates a usage example of a mobile content reproducing apparatus of the present embodiment. FIG. 4 illustrates a usage example of an installed stationary content reproducing apparatus of the present embodiment.

For example, a user 1 is now enjoying music while walking. As shown in FIG. 3, a walk sensor mounted on the walking user 1 as the physical motion sensor 51 detects a treading timing of each foot of the user 1 (onto ground). A physical motion signal thus detected is supplied to a mobile version of content reproducing apparatus 100.

As previously discussed, the controller 10 in the content reproducing apparatus 100 analyzes the detected output (sensor signal) of the treading timing (motion timing) of the user successively supplied from the physical motion sensor 51 and predicts the treading timing of the foot of the user. The controller 10 controls the reproduction timing of the content so that the timing indicated by the predetermined delimitation information of the content to be reproduced (such as the timing of beat or measure of the music) matches the predicted treading timing matches. The synchronization feeling and response feeling, felt by the user in response to the reproduced content, are thus improved.

The physical motion sensor 51 can be mounted at a predetermined location of the foot, the arm, or the head of the user. As shown in FIG. 3, a headphone is used as the audio output unit 22. The audio output unit 22 is not limited to the headphone.

The content reproducing apparatus 100 may reproduce a video content using the video display unit 24 such as an LCD. In such a case, the video content is controlled so that the timing indicated by the delimitation information of the video content is synchronized with a change timing of the physical motion of the user.

FIG. 4 illustrates the stationary content reproducing apparatus. The content reproducing apparatus includes a video display unit 24 having a large PDP (plasma display panel) screen or a large LCD screen, an audio output unit 23 composed two left and right channel speakers, a processing module composed of the controller 10, and the physical motion sensor 51.

The physical motion sensor 51 detects the motion of the user by capturing an image and detecting a change in the image. The physical motion sensor 51 is one of a video camera and an infrared sensor, for example. The sensor signal from the physical motion sensor 51 is supplied to the controller 10 in the processing module.

The controller 10 predicts the motion timing of the user based on the sensor signal from the physical motion sensor 51, and controls the content data so that the timing indicated by the delimitation information corresponding to the content data to be reproduced is synchronized with the motion timing.

If the content reproducing apparatus is a mobile music and video reproducing apparatus or a mobile telephone as shown in FIG. 3, one of a walk sensor, a physical motion sensor, an arm motion sensor may be used to match the delimitation timing of the content with a change point in the predicted walk gait or the predicted body motion. The synchronization feeling with the reproduced content is thus improved, and the response of the reproduced content is improved on a real-time basis.

If the content reproducing apparatus is a content reproducing apparatus installed indoors as shown in FIG. 4, a camera or a pressure sensor placed on floor may be used to synchronize the delimitation timing of the content with a change point in the predicted walk gait or the predicted body motion. The synchronization feeling with the reproduced content is thus improved, and the response of the reproduced content is improved on a real-time basis.

Figure 5:
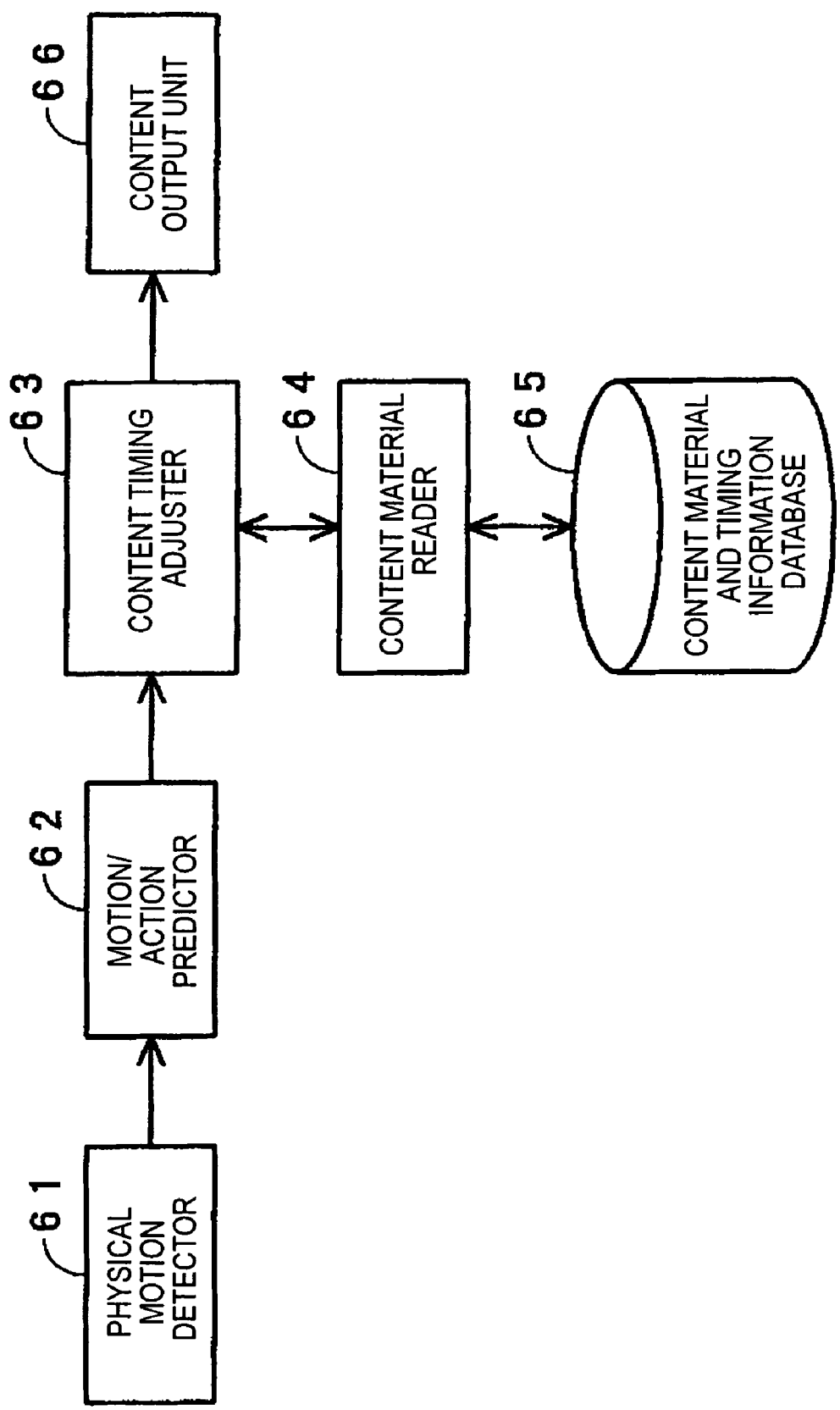
FIG. 5 is a functional block diagram of the content reproducing apparatus of FIG. 1.

The functional structure of the content reproducing apparatus 100 applicable as a mobile type or a stationary type is described below. FIG. 5 is a functional block diagram of the content reproducing apparatus 100 of FIG. 1. A physical motion detector 61, composed of the physical motion sensor 51 and the physical encoder 52, detects the motion of the user, such as the motion of each foot of the user during running, or the motion of the head of the user while listening to music.

A motion/action predictor 62, composed of the CPU 11, the ROM 12, and the RAM 13, predicts the feature point, the period, and the rhythm (tempo) of the motion of the body of the user by analyzing physical motion data captured from the physical motion detector 61 via the CPU bus 14.

The feature point of the body is a timing of a start point of the body motion (at which the user moves his body from a stationary state), an end point of the body motion (at which the user stops his body motion), a maximum point, a minimum point, a maximum peak point, or a minimum peak point. More specifically, the feature point is a timing of the user's foot treading during walking, or a timing of a turning point while the user swing his body.

A content timing adjuster 63 is composed of the CPU 11, the ROM 12, the RAM 13, and the output module 20. The content timing adjuster 63 generates a real-time content, based on the prediction results provided by the motion/action predictor 62, and a content material and timing information accompanying the content material, each of which is read by a content material reader 64 from a content material and timing information database 65.

The content material reader 64 is composed of the CPU 11, the ROM 12, the RAM 13, the I/F 31, the external I/F 41, the digital I/F 43, and the wireless I/F 44. The content material and timing information database 65 serves as a database for the recording medium 32 that stores content material data and timing information, or for a source server that transmits the content material data and the timing information.

A content output unit 66, composed of the audio output unit 22 and the video display unit 24, outputs the content that is generated at the timing adjusted by the content timing adjuster 63.

The content material is the material forming a final content. The content material may be an ordinary content itself (such as music data or video data, recorded on one of CD and DVD, or music data compressed in compliance with MP3). Preferably, the content material may be a short music piece as short as several measures, or a short video footage on a per scene unit or cut unit.

Meta information, such as delimitation information including timing information, indicating a beat timing, a scene change timing, etc. is attached to the content material data before recording or transmission. Alternatively, the timing information may be generated at the moment the content material is read.

If the content materials are a short music piece on a measure unit, or a short video footage on a scene unit or a cut unit, these content materials may be spliced with the time sequence relationship thereof fixed, and the reproduction time of the spliced video may be extended or shortened as necessary. The resulting single content is thus generated on a real-time basis.

The controller 10 in the content reproducing apparatus 100 performs a user body motion prediction process based on the detection output (sensor signal) output from the physical motion sensor 51. The user body motion prediction process is described below. In the present embodiment, the user motion includes the wide range of the user's body motion such as walking, raising the hand, and wagging the head, entering into a room, leaving a room, lying flat, standing up, etc.

Figure 6:
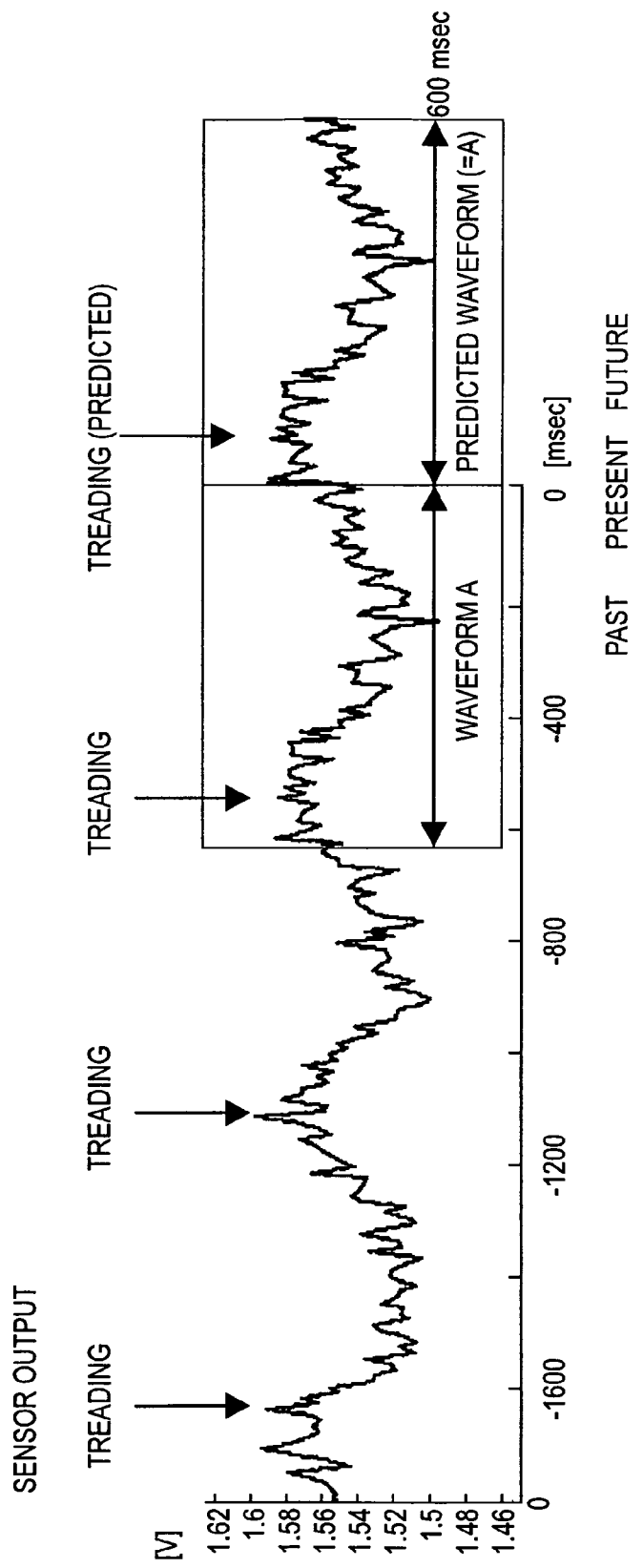
FIG. 6 illustrates a sensor signal output from an acceleration sensor mounted on a headphone.

The physical motion sensor 51 attached to a headphone worn by the user is now an acceleration sensor, for example. FIG. 6 illustrates a sensor signal waveform output from the acceleration sensor attached to the headphone.

The controller 10 in the content reproducing apparatus 100 predicts a future motion timing of the user body motion based on past time-series signal obtained from the physical motion sensor 51. The period of the motion timing of the user can be detected using an analysis technique such as auto-correlation operation or a frequency Fourier transform (more specifically, fast Fourier transform). The auto-correlation technique is used herein.

Figure 7:
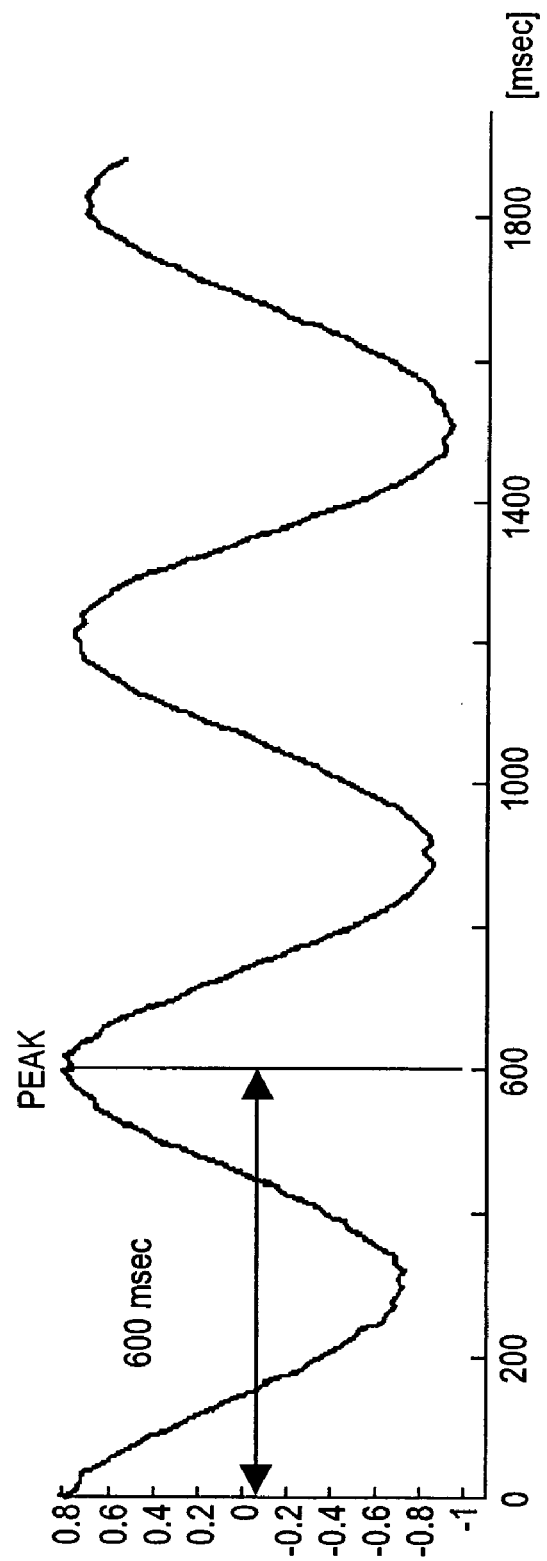
FIG. 7 illustrates an auto-correlated waveform that is obtained by converting the sensor signal of FIG. 6 through an auto-correlation function.

As shown in FIG. 6, current time is 0 millisecond (msec), and a waveform of auto-correlation function is acquired from past sensor signal. FIG. 7 illustrates an auto-correlation function waveform that is obtained by converting the sensor signal of FIG. 6 through the auto-correlation function. In the auto-correlation waveform of FIG. 7, peak-to-peak time interval is 600 msec. The period of the sensor signal of the physical motion sensor 51, namely, the motion timing of the user (period of variations) is 600 msec.

Since the sensor signal waveform of FIG. 6 has a period of 600 msec, a waveform A of the immediate past 600 msec is assumed to be a predicted waveform. More specifically, the immediate past 600 msec waveform A with respect to the current time is set to be an immediate future 600 msec waveform predicted.

In this example, the future sensor signal is expected to vary in the same way as in the past. If the period of 600 msec is repeated, a maximum value (at a treading timing) is present in the predicted waveform, and a next treading timing is thus predicted.

Using the FFT technique, the sensor signal from the physical motion sensor 51, as time-series data, is converted into frequency-component data to detect the period of the original time-series data. Alternatively, the period of the sensor signal may be detected using a technique other than the auto-correlation operation and the FFT technique to predict the motion timing of the user.

There are cases where wave prediction can be performed without using any particular technique such as the auto-correlation technique. In one of such typical cases, the sensor signal takes a predetermined value, and then a motion timing occurs after a predetermined time elapse subsequent to the sensor signal having taken the predetermined value. For example, time at which the user is expected to arrive at a predetermined location is predicted from information including travel speed, position, and bearing of travel of the user provided by the GPS system. The reproduction of the content is controlled in synchronization with the predicted time.

The delimitation information indicates the timing of the content data that needs to be synchronized with the motion timing of the user that is obtained by analyzing the sensor signal from the physical motion sensor 51. The delimitation information is described more specifically. The delimitation information is meta information of the corresponding content data, and may be supplied together with or separately from the corresponding content data. Alternatively, the delimitation information may be generated by analyzing the content data.

Figure 8:
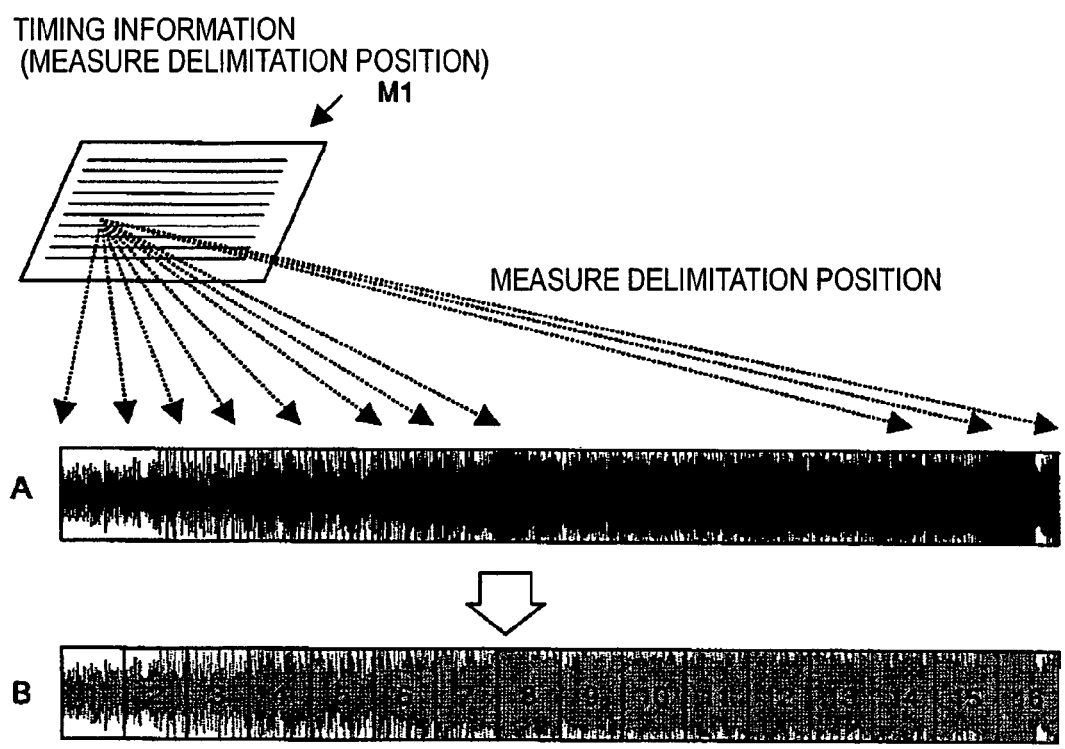
FIG. 8 illustrates music content data having measure as delimitation information.

Referring to FIG. 8, the content data is the music content data recorded on an optical disk, and the delimitation information is measure. More specifically, information indicating a delimitation position (measure delimitation information) is delimitation information M1. The delimitation information M1 may include time information of a sub code, a sector address and a cluster address of the optical disk, the number of bytes or bits from the start of the content, the number of samples from the start of the content, and the number of reference clocks from the start of the content. If the music content data is compressed, the delimitation information M1 may be represented by the number of compressed blocks from the start of the content.

If the number of bytes or bits, the number of samples, or the number of compressed blocks is used, the delimitation information M1 is not limited to the value counted from the start, but may be a value representing a difference in number counted from immediately preceding delimitation information. Alternatively, the delimitation information M1 may be represented by a value counted with respect to a predetermined location, such as the final position of the content. Such delimitation information is managed and used in association with the corresponding content data.

If the music content data of portion A of FIG. 8 is delimited using the delimitation information, the data becomes the one as shown in portion B of FIG. 8. As shown in the portion B of FIG. 8, the data is delimited according to measure, and each delimited measure can be identified and handled as independent data. Using the measure delimitation information, play time of each measure is synchronized with the motion of the feet of a walking user.

The delimitation information of the music content data is here the measure delimitation information. The delimitation information is not limited to the measure delimitation information. For example, the delimitation information may be information relating to delimitation of a measure of the music content, beat, melody change, a start of a highlight portion of the music content, an end of the highlight portion of the music content, a start of the music content, or an end of the music content. If the content data is video data, the delimitation information may be a feature point such as a video scene change or a video cut change.

The delimitation information may be represented in a variety of ways depending on how the content data of the content to be reproduced is supplied, and the type of content data. For example, if the content data is supplied on an optical disk as a recording medium, the delimitation information is represented using the sub code time information of the disk or the sector address of the optical disk. If the content data is supplied on a hard disk, the delimitation information is represented using the cluster address.

If the content data is video data, the delimitation information may be represented using the time code of TV/Video. Furthermore, the delimitation information may be represented using the number of bytes or the number of samples from the start of the content, GOP (group of picture) unit, a video frame unit, a sound frame unit, a compression block unit of compressed audio, or a difference of each of these pieces of information from the respective preceding delimitation information.

In the content reproducing apparatus of the present embodiment, the motion timing of the user is predicted from the detection output of the physical motion sensor 51, and the content is reproduced in a manner such that the reproduction timing of the content is synchronized with the feature point, the period, or the rhythm of the body motion of the user.

The feature point of the body motion of the user may be one of the start point of the body motion, the end point of the body motion, a maximum point, a minimum point, the maximum peak point, and the minimum peak point. More specifically, the feature point may be the user's treading timing during running, or the turning timing in the swinging of the body motion.

Figure 9:
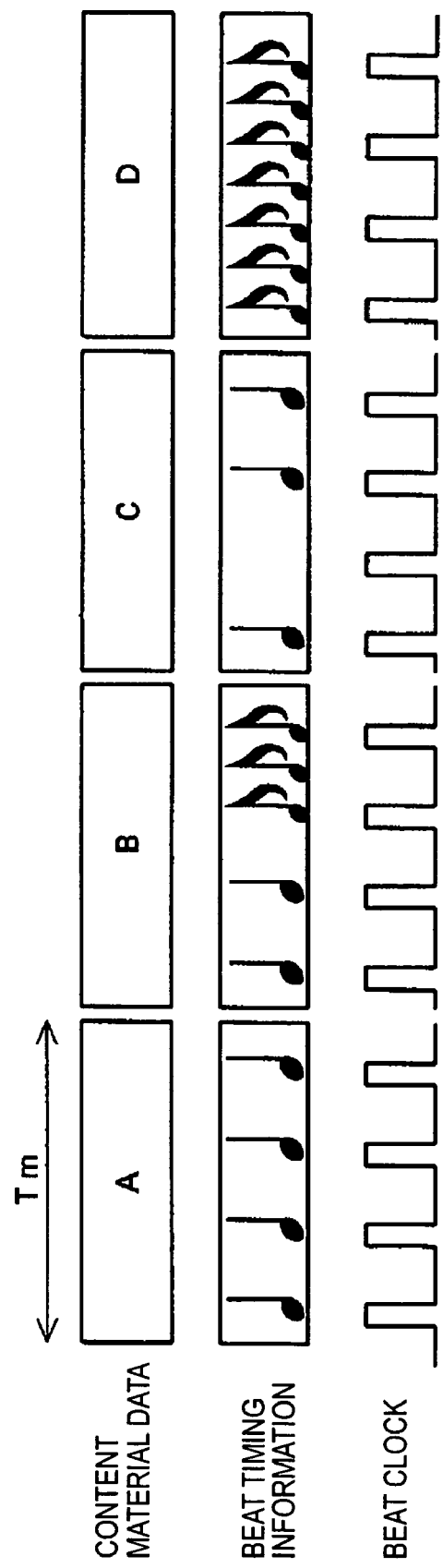
FIG. 9 illustrates a short music piece having a measure unit as a content material.

When the music content data is reproduced, four content materials A, B, C, and D, each corresponding to one measure of music piece, are used as shown in FIG. 9, for example. The four content materials A, B, C, and D are spliced into a single music content.

A phrase, composed of the contents materials A-D, may be music instrument digital interface (MIDI) data, or pulse code modulation (PCM) data. If a phrase is MIDI data, beat timing information is directly extracted therefrom. When a content to be discussed later is generated, the amount of computation involved is small. If a phrase is PCM data, the content materials A-D are pure sound waveform. In this case, beat timing information is generated beforehand and recorded or transmitted together with the content materials A-D.

The beat timing information may be calculated from the waveform of the content material immediately prior to the reproduction of the content material. In this case, the beat timing information may be calculated in a method disclosed by Masataka GOTO, in a paper entitled "An Audio-based Real-time Beat Tracking System for Music With or Without Drum-sounds", Journal of New Music Research, Vol. 30, No. 2, pp. 159-171, June 2001, and also by Masataka GOTO in the book entitled "Beat Tracking, Computer and Music World . . . From Basics to Frontier", Kyoritsu Shuppan, pp. 100-116, August 1998.

The content materials A-D are spliced into a single music piece as shown in FIG. 9. Each of the content materials A-D had a single measure length equal to Tm.

Figure 10:
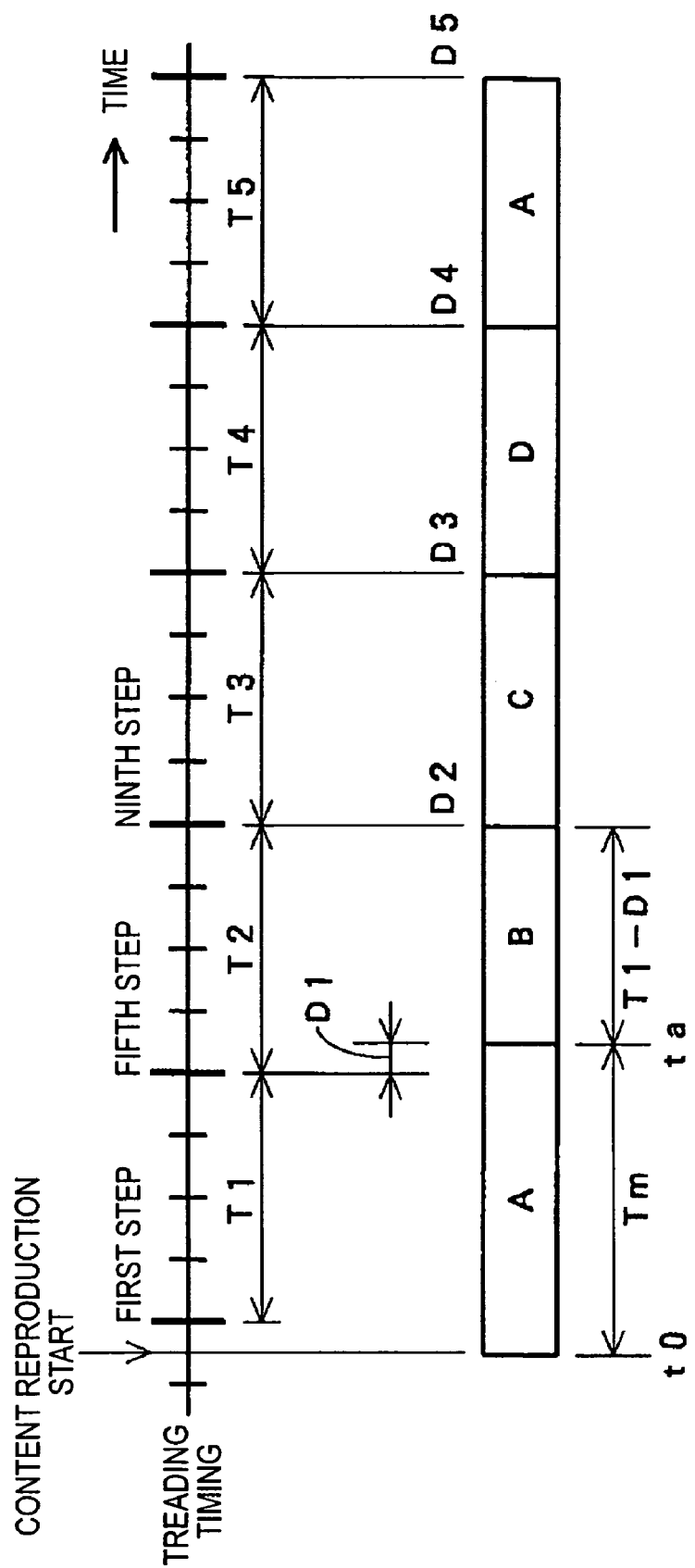
FIG. 10 illustrates a first reproduction method of the music content.

FIG. 10 illustrates a first method for synchronizing the timing of the content with the walk tempo of the user. In the first method, when the walking tempo of the user reaches a predetermined value, each content material is expanded or contracted so that the start timing of each content is synchronized with the treading timing.

More specifically, a beat is introduced at the beginning of each of the measures A-D as shown in FIG. 9, and every four steps, the beginning of the measures A-D is synchronized with the treading timing. The number of steps for synchronizing the measures is not limited to four. For example, the majority of marches has a tempo of 120, namely, one beat=one step=0.5 seconds, and has one measure per four steps (beats). If the number of steps for measure synchronization is set to be four, the beginning of each of the measures A-D can be synchronized with the treading timing without the need for expanding or contracting the content material in a large time length. Here, the content materials are reproduced in the reproduction order of A→B→C→D→A→B . . .

As shown in FIG. 10, at time t0, the user starts the content reproduction. The first measure A is reproduced for a period Tm. A step trodden and detected subsequent to the content reproduction start time t0 is set as a first step. When a fifth step is trodden and detected, time T1 for the four-step length from the first step to the fifth step is calculated.

Time D1 between the reproduction end point ta of the first measure A and the time at which the fifth treading is detected is calculated, and a difference (T1−D1) between time T1 and time D1 is calculated. The second measure B is multiplied by (T1−D1)/Tm so that the reproduction time of the second measure B becomes the difference (T1−D1).

As shown in FIG. 10, the first measure A ends at the moment the fifth step is trodden. If D1>0, the difference (T1−D1) is shorter than each of time T1 and time Tm, and (T1−D1)/Tm<1, the second measure is contracted in reproduction.

If the first measure A ends before the fifth step is detected, the reproduction of the measure A also re-starts at that moment. When the fifth step is trodden and detected, the reproduction of the measure A stops. In this case, D1<0, the difference (T1−D1) can be longer than each of time T1 and time D1. If the difference (T1−D1) is longer than time Tm, and (T1−D1)/Tm>1, the measure B is expanded.

Similarly, each measure is successively reproduced in a manner such that a difference (Tn−Dn) (n=1, 2, 3, 4, . . . ) is set to be the reproduction time of the (n+1)-th measure. When the reproduction of the fourth measure D is complete, the measure A is reproduced again.

If the walking temp is not varied as shown in FIG. 10, T1=T2=T3=T4 . . . , and Dn=0 except D1. The beginning of each measure is synchronized with the treading timing.

Since the measure, as the content material, is expanded or contracted before being reproduced, continuity of the music piece is maintained.

Figure 11:
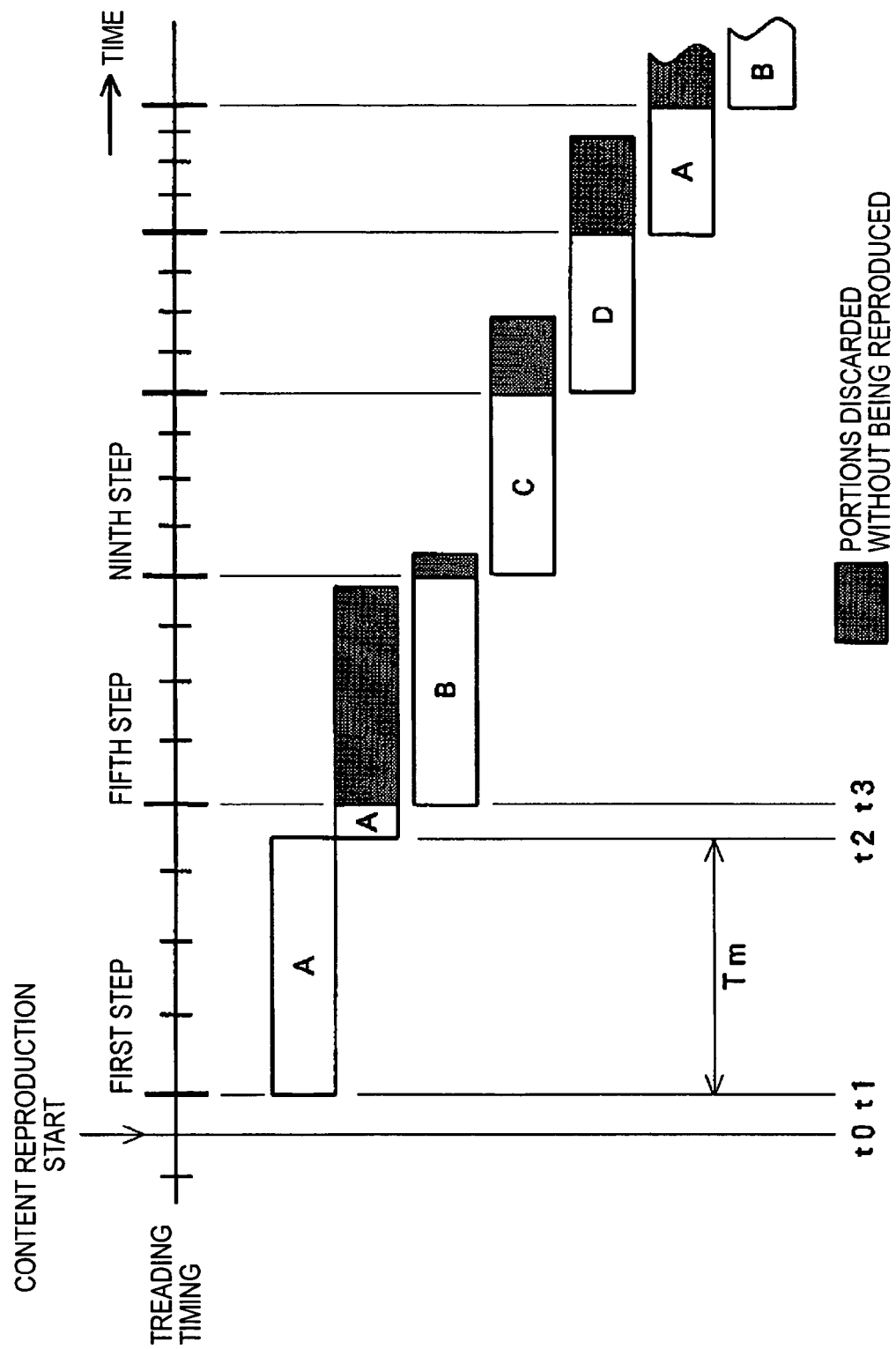
FIG. 11 illustrates a second reproduction method of the music content.

A second method of synchronizing the timing of the content with the walking tempo is illustrated in FIG. 11. The second method is appropriate if the walking tempo varies greatly. Without expanding or contracting the content material, the start timing of each content material is forced to synchronized with the treading timing.

Referring to FIG. 11, a beat is placed at the beginning of each of measures A-D. In a manner similar to FIG. 10, the beginning of the each of the measures A-D is synchronized with the treading timing every four steps. When the user instructs the content reproduction start at time t0, the first measure A starts at the moment the first treading (step) is detected at time t1. The measure A is reproduced for a time length of Tm.

If the time from the first step to the fifth step is longer than time Tm, the reproduction of the measure A ends before the fifth treading is detected. The reproduction of the measure A is started again at time t2. At time t3, the fifth treading is detected, and the reproduction of the measure A is stopped, and immediately, the measure B is started.

If the time from the first step to the fifth step is shorter than time Tm, the fifth treading is detected before the end of the reproduction of the measure A. At that moment, the reproduction of the measure A is stopped, and the reproduction of the measure B is immediately started.

Without being expanded or contracted, the measure B is reproduced to the moment the ninth treading is detected. As shown in FIG. 11, if the time from the fifth step to the ninth step is shorter than time Tm, and the ninth treading is detected before the end of the reproduction of the measure B, the reproduction of the measure B is stopped then. The reproduction of the measure C is immediately started. Conversely, if the time from the fifth step to the ninth step is longer than time Tm, and the reproduction of the measure B ends before the detection of the ninth treading, the reproduction of the measure B is started again. At the moment the ninth treading is detected, the reproduction of the measure B is stopped. The reproduction of the measure C is immediately started.

Similarly, each measure is reproduced without being expanded and contracted. When the fourth measure D is fully reproduced, the reproduction process returns to the first measure A.

As shown in FIG. 11, each of the second measure and the subsequent measures is not reproduced to the end thereof even if the walking tempo becomes faster.

In this example, no continuity is maintained at the splicing point of each measure. However, last measure at the splicing point can be faded out and faded in to reduce feeling of strangeness. If the content material is a short sound (such as a drum sound) requiring no continuity at a splicing point, the second method is preferable.

The content is music in the first and second methods. If the content is a moving image or still image, the timing of the content may be synchronized with the body motion of the user during reproduction.

More specifically, the timing of a scene change or a cut change in the moving image is synchronized with the timing of the turning point of the swinging of the body of the user. In this case, the moving image at one scene unit or one cut unit is used as a content material.

For example, when a plurality of still images may be reproduced as in a slide show, the timing of switching from one still image to a next still image is synchronized with the turning point of the swinging body motion of the user. Still image of one page (file unit) may be used as a content material.

Figure 12:
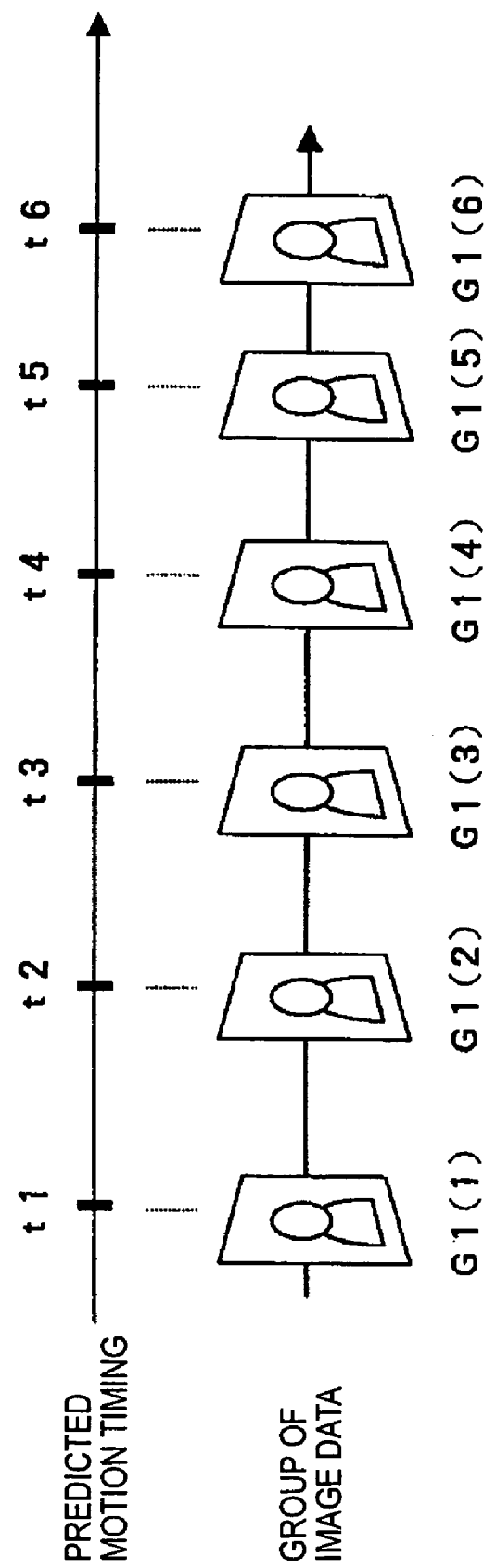
FIG. 12 illustrates a switch timing of a video content synchronized with a predicted motion of a user.

The content data can be video data. FIG. 12 illustrates the video content that is switched in synchronization with a predicted body motion of the user. As shown in FIG. 12, predicted body motion timings t1, t2, t3, . . . of the user, namely, the periodical body motion of the user (including the motion of the head, and the hands) is detected. The timings of the scene change or the cut change of the moving image, such as the video contents G1(1), G1(2), G1(3), . . . , are synchronized with the timings t1, t2, t3, . . . The moving image may be switched to a still image at the timings t1, t2, t3, . . . The reproduction timing of the video content is thus synchronized with the motion timing of the user.

Even if the content is vibration or light, the present invention is applicable. If the content is vibration, a change timing in the frequency (period) of the vibration or the intensity (amplitude) of the vibration is synchronized with the turning point of the swinging body motion of the user predicted based on the detection output of the physical motion sensor 51. In this case, data for generating a vibration having a predetermined vibration pattern is used as the content data.

If the content is light, the body motion is predicted based on the detection output from the physical motion sensor 51. A change in the color (wavelength) of the light or brightness (illuminance) of the light is synchronized with the turning point of the body swinging motion of the user. In this case, data for generating light having a certain color or illuminance is used as the content data.

The present invention is also applicable to fitness machines. For example, in a running machine, a driving speed may change with time elapse, and in a resistance training machine, a force applied changes with time. A change timing in the driving speed or the applied force of the fitness machine, namely, the driving control timing (reproduction control timing) is synchronized with the motion timing of the user predicted based on the detection output of the physical motion sensor 51.

Driving control data of the running machine or the resistance training machine is used as the content material. The driving control timing of the fitness machine works in two ways, namely, in one way that a load acting on the user is increasing, and in the other way that the load acting on the user is decreasing.

The content data to be reproduced includes one of audio data, video data, and AV data. Furthermore, the present invention is applicable when the content to be reproduced is one of vibration, light, driving control data for a fitness machine, and control data for driving a variety of actuators.

Laser illumination in a concert hall may be handled as a content. A change in laser illumination is synchronized with a predicted motion timing of a player or audience. The motion of a mirror ball may also be handled as a content. The rotation of the mirror ball is synchronized with a predicted motion timing of a player or audience. Furthermore, the progress of a computer game may be synchronized with a predicted motion timing of a game player.

Laser illumination in a concert hall and operation of a mirror ball can be controlled by controlling an actuator of the laser illumination and an actuator of the mirror ball, respectively. By controlling an actuator (such as a robot) outputting a variety of physical quantities perceived by a user, the operation of the actuator can be synchronized with the body motion timing of the user. By controlling a variety of actuators driving a variety of things, the operation timing of the things driven by the actuators are synchronized with the predicted body motion timing of the user.

The content reproduction process of the content reproducing apparatus 100 and a variety of other apparatuses, incorporating the embodiment of the present invention, is described below with reference to a flowchart of FIG. 13. For simplicity of explanation, the process illustrated in FIG. 13 is performed by the content reproducing apparatus 100 previously discussed with reference to FIGS. 1 and 2.

Figure 13:
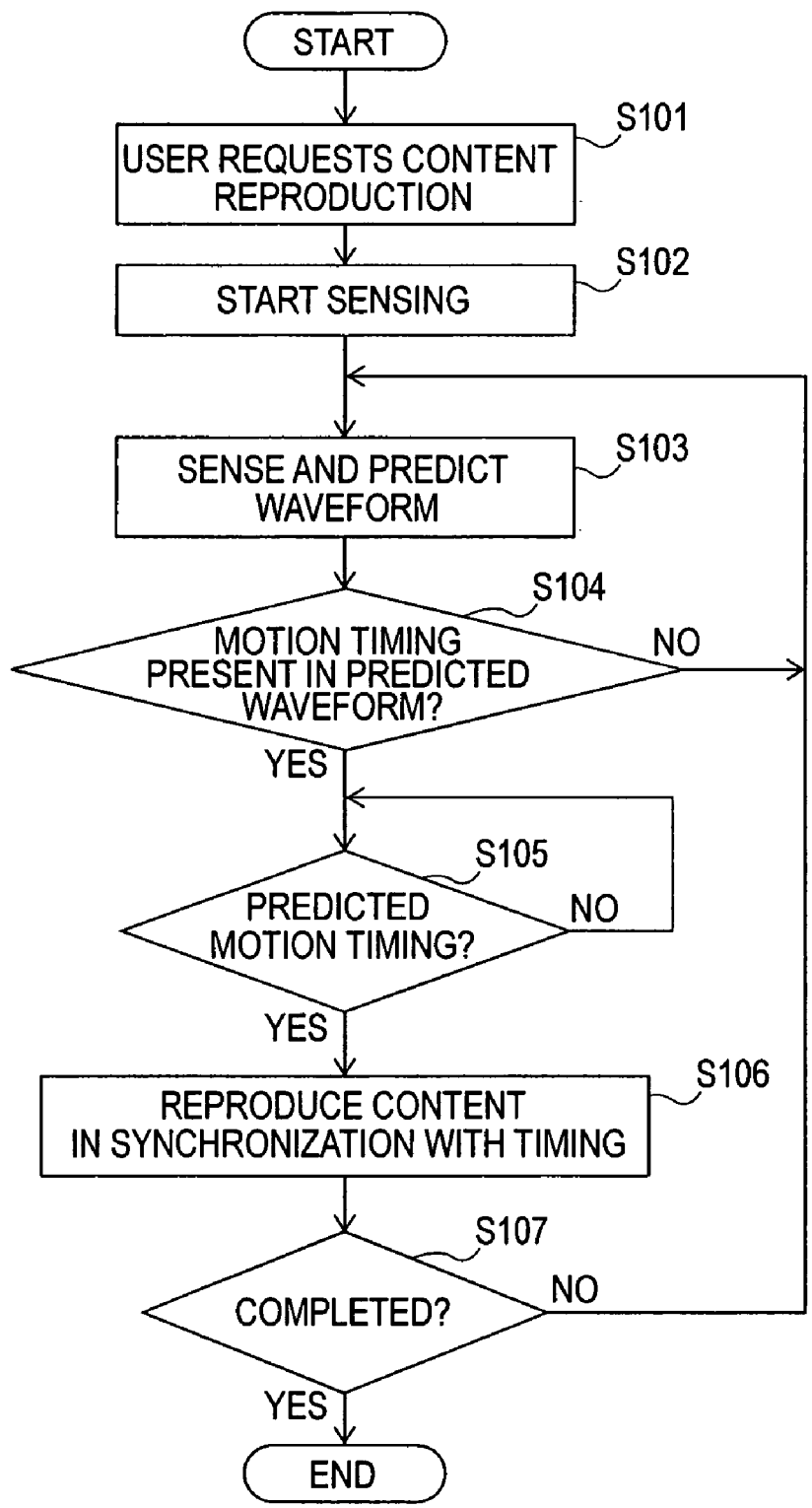
FIG. 13 is a flowchart illustrating a content reproduction process of the content reproducing apparatus.

The process illustrated in FIG. 13 is performed by the controller 10 in the content reproducing apparatus 100 when the content reproducing apparatus 100 is switched on. Upon being switched on, the controller 10 in the content reproducing apparatus 100 receives a content reproduction instruction from the user via the input I/F 42 (step S101).

Upon receiving the content reproduction instruction from the user in step S101, the controller 10 in the content reproducing apparatus 100 receives the detection output (sensor signals) from the physical motion sensor 51 via the decoder 52, and starts sensing the body motion of the user (step S102).

In response to the detection output successively supplied from the physical motion sensor 51 via the decoder 52, the controller 10 predicts the motion waveform of the user, and the body motion timing of the user (step S103). The controller 10 determines, based on the prediction results obtained in step S103, whether a predetermined motion timing is present in the predicted waveform (step S104).

If it is determined in step S104 that no motion timing is present in the predicted waveform, operations in step S103 and S104 are repeated. If it is determined in step S104 that a motion timing is present in the predicted waveform, the controller 10 determines whether it is a predicted motion timing (step S105).

If it is determined in step S105 that it is not yet the predicted motion timing, operation in step S105 is repeated to wait for the predicted motion timing to arrive. If it is determined in step S105 that it is the predicted motion timing, the controller 10 controls the reproduction timing to cause the predetermined timing identified by the delimitation information of the content to be synchronized with the predicted motion timing, and then reproduces the content (step S106).

The controller 10 determines whether the reproduction of the content has been completed (step S107). If it is determined in step S107 that the reproduction of the content has not yet been completed, step S103 and subsequent steps are repeated again. The body motion of the user is thus sensed, and then the body motion timing of the user is predicted. The reproduction timing of the content is repeatedly synchronized with the body motion timing. If it is determined in step S170 that the reproduction of the content has been completed, the process of FIG. 13 ends.

The content reproducing apparatus 100 or other apparatuses, incorporating the embodiment of the present invention, sense the motion of the user through the physical motion sensor, predicts the body motion timing of the user, and causes the reproduction timing of the content to be synchronized with the predicted body motion timing. Synchronization feeling and response of the user to the reproduced content are thus improved. The content is effectively used.

Figure 14:
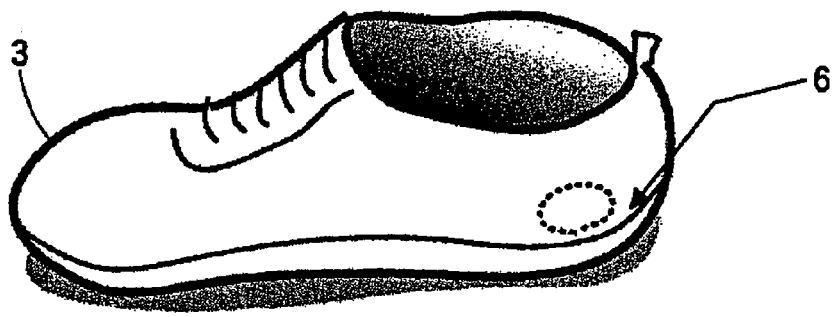
FIG. 14 illustrates an installed walk sensor.

The physical motion sensor 51 detecting the motion of the user can be any of a variety of types. The physical motion sensor 51 is specifically described below. FIG. 14 illustrates a walk (step) sensor 6 installed in the heel of a shoe 3. The walk sensor 6 may be one of a distortion sensor, an acceleration sensor, a bend sensor, a pressure sensor, a distance measurement sensor, a tilt sensor, a magnetic sensor, an electric current sensor, an electric charge sensor, an electric capacitance sensor, and an electromagnetic induction sensor. By picking up a sound with a microphone, a treading timing of the foot can be detected.

The reading timing is detected using one of the above-mentioned sensors. Alternatively, the timing of the tuning point of the motion of the head or the hand is detected.

To detect the timing of the turning point of the swinging motion of the head, an acceleration sensor is simply installed on a headphone mounted on the head of the user as shown in FIG. 15. To detect the gait walk through the acceleration sensor, auto-correlation of the resulting sensor signal is calculated. The acceleration sensor can be installed on another type of mobile device to detect the body motion of the sensor. Many of mobile music devices using a hard disk employ an acceleration sensor for detecting a fall, and the output of that sensor may be used.

Figure 15A:
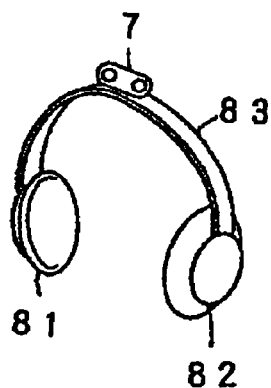
FIGS. 15A-15C illustrate how the motion of the head is detected.
Figure 15B:
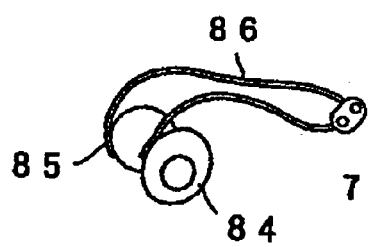
Figure 15C:
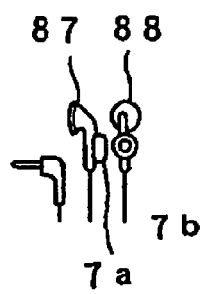

FIG. 15A illustrates an acceleration sensor 7 mounted on a headband 83 connecting left and right speakers 81 and 82 in a head-mounted type headphone. FIG. 15B illustrates an acceleration sensor 7 mounted on a neckband 86 connecting left and right speakers 84 and 85 in a neck-mounted type headphone. FIG. 15C illustrates acceleration sensors 7a and 7b mounted respectively on left and right speakers 87 and 88 inserted into the ear holes in an inner-ear type headphone.

Figure 16:
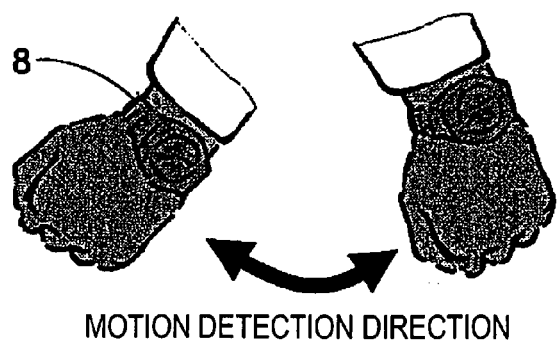
FIG. 16 illustrates how the motion of the hands is detected.

To detect the timing of the turning point of the swinging motion of the hand, a wrist-watch type acceleration sensor 8 is worn around the wrist of the user as shown in FIG. 16.

The physical motion sensor 51 may be mounted on any portion of the user body, including the foot, the head, the neck, hand, calf, knee, thigh, the waist, the torso, upper arm, and elbow of the user. The physical motion sensor 51 may be mounted on a heel, toe, instep, or ankle. The physical motion sensor 51 may be mounted on wrist, finger, or back of his hand. The physical motion sensor 51 may also mounted on an object carried by or worn by the user.

The content reproducing apparatus of the present embodiment predicts the body motion and the timing of the body motion of the user from the sensor information, and reproduce the content in synchronization with the predicted timing. The delimitation timing of the content is accurately synchronized with the user body motion. The reproduced content thus provides more entertainment and lift to the user.

The content data to be reproduced may or may not be compressed. If the content data is compressed, a decompression process (decode process) is performed during reproduction.

The content data may be supplied on one of a CD or DVD, via a network such as the Internet, via the wireless I/F 44, or from an external apparatus via an external interface.

The delimitation information as the meta information of the corresponding content data may be supplied on the same recording medium as the corresponding content data or on a recording medium different from the recording medium of the corresponding content data. A combination of the controller 10 and the I/F 31, or a combination of the controller 10 and the digital I/F 43 functions as acquisition means for acquiring the delimitation information.

The delimitation information may supplied via the Internet or from the external apparatus. In such a case, a combination of the controller 10 and the external I/F 41, or a combination of the controller 10 and the wireless I/F 44 functions as acquisition means for acquiring the delimitation information.

The content data and the delimitation information corresponding thereto are associated with each other by predetermined information just in case the content data and the delimitation information are supplied separately from each other.

The delimitation information corresponding to the content data is used as the timing information. The present invention is not limited to this arrangement. As long as the meta information corresponding to the content data is available with no delimitation information present, synchronization feeling to the user is improved by synchronizing the reproduction start timing and the reproduction stop timing of the content with the body motion timing of the user. Better real-time response of the reproduced content is thus achieved. In this case, the controller 10 functions as generating means for generating the delimitation information for the content data.

The content data and the corresponding delimitation information may be supplied on the same recording medium or different recording media, or may be supplied via a variety of networks, or from an external apparatus, concurrently or separately. The content data and the corresponding delimitation information may be stored on the recording medium 32 for later use.

The content data and the corresponding delimitation information, supplied on the same recording medium, may be recorded on separate files or on separate chunks within the same file. For example, the controller 10 uses the content data and the delimitation information separately, by reading the content data and the delimitation information separately.

The controller 10 can generate the delimitation information from the content data. In this case, a variety of generation methods are available. For example, if the content data is audio data, the controller 10 generates the delimitation information based on beat or rhythm. If the content data is video data, the controller 10 analyzes images of the video data to detect a scene change point, and generates the delimitation information based on the scene change point.

The controller 10 can add, modify, or delete the delimitation information to the content data stored on the recording medium 32 in response to a user operational input received via the input I/F 42.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for reproducing a content, the apparatus comprising:

reproduction processing means for reproducing the content;

detecting means for detecting a motion of a person;

predicting means for predicting a timing of a feature point of the motion of the person, based on an output from the detecting means;

selecting means to select a target delimitation position anywhere along a timeline of the content for synchronizing with the feature point of the motion of the person, the target delimitation position identifiable via metadata including timing information, the metadata provided in association with the content to be reproduced; and control means for controlling the reproduction processing means to synchronize the target delimitation position with the feature point of the motion of the person, the synchronizing utilizing the metadata and the predicted timing of the feature point of the motion predicted by the predicting means.

2. The apparatus according to claim 1, wherein the detecting means comprises at least one sensor selected from a group consisting of an acceleration sensor, a shock sensor, a global positioning system sensor, a bearing sensor, a bend sensor, a pressure sensor, an image sensor, a pyroelectric sensor, an infrared sensor, an electric charge sensor, a distortion sensor, a distance measurement sensor, a tilt sensor, a magnetic sensor, an electric current sensor, an electric capacitance sensor, and an electromagnetic induction sensor.

3. The apparatus according to claim 1, wherein the predicting means predicts the timing of the feature point of the motion using one of an auto-correlation calculation technique and a frequency conversion calculation technique.

4. The apparatus according to claim 1, wherein the content to be reproduced comprises one of an audio, a video, light, and a physical operation performed by an actuator.

5. The apparatus according to claim 1, further comprising acquisition means for acquiring, from a recording medium, the timing information corresponding to the content to be reproduced, wherein the timing information is supplied on a recording medium, which is the same as or different from a recording medium storing content data of the content to be reproduced.

6. The apparatus according to claim 1, further comprising generating means for generating the timing information from content data of the content to be reproduced by analyzing the content data.

7. The apparatus according to claim 1, further comprising acquisition means for acquiring the timing information from an area in a same file as a file that stores content data of the content to be reproduced.

8. The apparatus according to claim 1, further comprising connection acquisition means for acquiring the timing information corresponding to the content to be reproduced, by connecting to a server through a network, and using a predetermined identifier, wherein the timing information is stored in the server over the network.

9. The apparatus according to claim 1, wherein the content to be reproduced comprises a music content, and wherein the timing information includes at least one of music feature change points including delimitation of a measure of the music content, beat, melody change, a start of a highlight portion of the music content, an end of the highlight portion of the music content, a start of the music content, and an end of the music content.

10. The apparatus according to claim 1, wherein the timing information is used taking into consideration a type of means of providing content data of the content to be reproduced, and a type of the content data, and wherein the timing information is expressed by one of sub-code time data of an optical disk, a sector address of the optical disk, a cluster address, time code of TV/video, a number of bytes from a start of the content, a number of samples from the start of the content, a number of reference clocks from the start of the content, a number of group of picture units from a start of the content, a number of video frame units from the start of the content, a number of sound frame units from the start of the content, a number of compression block units of compressed audio from the start of the content, and a difference between a current value of each piece of data and a preceding value thereof at an immediately preceding delimitation.

11. The apparatus according to claim 1, wherein the content to be reproduced comprises a video content, and wherein the timing information includes a video feature change point including one of a scene change and a cut change in a video.

12. The apparatus according to claim 1, further comprising:

a rewritable recording medium for storing the timing information;

receiving means for receiving a request to modify and/or delete the timing information recorded on the recording medium, and a request to write additionally timing information onto the recording medium; and update means for modifying and/or deleting the timing information recorded on the recording medium, and writing additionally the timing information onto the recording medium in response to the request received by the receiving means.

13. The apparatus according to claim 1, wherein the control means controls a reproduction start timing of the content to be synchronized with the motion of the person.

14. The apparatus according to claim 1, wherein the motion of the person comprises a walking movement of the person, an up and down motion of a body of the person, a swing motion of a head of the person in forward and backward directions or lateral direction, an arm waving movement, a forward and backward or lateral movement of a torso, a movement of the body entering into a room and leaving the room, or a change in posture of the body; and the detecting means detects at least one feature point of the motion of the person.

15. A method of reproducing a content, the method comprising steps of:

detecting a motion of a person;

predicting a timing of a feature point of the motion of the person, based on the motion detected in the detecting step;

selecting a target delimitation position anywhere along a timeline of the content for synchronizing with the feature point of the motion of the person, the target delimitation position identifiable via metadata including timing information, the metadata provided in association with the content to be reproduced; and controlling the reproduction of the content to synchronize the target delimitation position with the feature point of the motion of the person, wherein the synchronizing utilizes the metadata and the predicted timing of the feature point of the motion.

16. An apparatus for reproducing a content, the apparatus comprising:

a reproduction processing unit for reproducing the content;

a detecting unit for detecting at least one feature point of the motion of a person;

a predicting unit for predicting a timing of the at least one feature point of the motion of the person, based on an output from the detecting unit;

a user interface unit for selecting a target delimitation position anywhere along a timeline of the content for synchronizing with the at least one feature point of the motion of the person, the target delimitation position identifiable via metadata including timing information, the metadata provided in association with the content to be reproduced; and a control unit for synchronizing the target delimitation position with the at least one feature point of the motion of the person, wherein the synchronizing utilizes the metadata and the predicted timing of the at least one motion.

17. The apparatus of claim 16, wherein the detecting unit comprises at least one sensor selected from a group consisting of an acceleration sensor, a shock sensor, a global positioning system sensor, a bearing sensor, a bend sensor, a pressure sensor, an image sensor, a pyroelectric sensor, an infrared sensor, an electric charge sensor, a distortion sensor, a distance measurement sensor, a tilt sensor, a magnetic sensor, an electric current sensor, an electric capacitance sensor, and an electromagnetic induction sensor.

18. The apparatus of claim 16, further comprising a generating unit for generating the timing information from content data of the content to be reproduced by analyzing the content data.

19. The apparatus of claim 16, wherein the content to be reproduced comprises a music content, and wherein the timing information includes at least one of music feature change points including delimitation of a measure of the music content, beat, melody change, a start of a highlight portion of the music content, an end of the highlight portion of the music content, a start of the music content, and an end of the music content.

20. The apparatus of claim 16, wherein the content to be reproduced comprises a video content, and wherein the timing information includes a video feature change point including one of a scene change and a cut change in a video.

21. The apparatus of claim 16, wherein the control unit controls a reproduction start timing of the content to be synchronized with the motion of the person.

\* \* \* \* \*